US 9,413,785 B2

(12) United States Patent
Cooper et al.

(10) Patent No.: US 9,413,785 B2
(45) Date of Patent: *Aug. 9, 2016

(54) SYSTEM AND METHOD FOR INTERLOCKING A HOST AND A GATEWAY

(71) Applicant: McAfee, Inc., Santa Clara, CA (US)

(72) Inventors: Geoffrey Howard Cooper, Palo Alto, CA (US); David Frederick Diehl, Minneapolis, MN (US); Robert Ma, Sunnyvale, CA (US)

(73) Assignee: McAfee, Inc., Santa Clara, CA (US)

( * ) Notice: Subject to any disclaimer, the term of this patent is extended or adjusted under 35 U.S.C. 154(b) by 87 days.

This patent is subject to a terminal disclaimer.

(21) Appl. No.: 14/277,954

(22) Filed: May 15, 2014

(65) Prior Publication Data
US 2014/0250492 A1 Sep. 4, 2014

Related U.S. Application Data

(63) Continuation of application No. 13/437,900, filed on Apr. 2, 2012, now Pat. No. 8,739,272.

(51) Int. Cl.
H04L 29/06 (2006.01)
(52) U.S. Cl.
CPC ............ *H04L 63/20* (2013.01); *H04L 63/0245* (2013.01); *H04L 63/029* (2013.01)
(58) Field of Classification Search
CPC .... H04L 63/0245; H04L 63/029; H04L 63/20
See application file for complete search history.

(56) References Cited

U.S. PATENT DOCUMENTS

| | | | |
|---|---|---|---|
| 4,688,169 | A | 8/1987 | Joshi |
| 4,982,430 | A | 1/1991 | Frezza et al. |
| 5,155,847 | A | 10/1992 | Kirouac et al. |
| 5,222,134 | A | 6/1993 | Waite et al. |
| 5,390,314 | A | 2/1995 | Swanson |
| 5,521,849 | A | 5/1996 | Adelson et al. |
| 5,560,008 | A | 9/1996 | Johnson et al. |
| 5,699,513 | A | 12/1997 | Feigen et al. |
| 5,778,226 | A | 7/1998 | Adams et al. |

(Continued)

FOREIGN PATENT DOCUMENTS

| | | |
|---|---|---|
| CN | 1383295 A | 12/2002 |
| CN | 101147379 | 3/2008 |

(Continued)

OTHER PUBLICATIONS

"Xen Architecture Overview," Xen, dated Feb. 13, 2008, Version 1.2, http://wiki.xensource.com/xenwiki/XenArchitecture?action=AttachFile&do=get&target=Xen+architecture_Q1+2008.pdf, printed Aug. 18, 2009 (9 pages).

(Continued)

*Primary Examiner* — Chau Le
(74) *Attorney, Agent, or Firm* — Patent Capital Group

(57) ABSTRACT

A method is described in example embodiments below that include receiving a content tag associated with transferring a file over a network connection. A session descriptor may also be received. The session descriptor and the content tag may be correlated with a network policy, which may be applied to the network connection. In some embodiments, the content tag may be received with the session descriptor. The file may be tainted by another file in some embodiments, and the content tag may be associated with other file.

24 Claims, 6 Drawing Sheets

(56) References Cited

U.S. PATENT DOCUMENTS

| | | | |
|---|---|---|---|
| 5,778,349 A | 7/1998 | Okonogi | |
| 5,787,427 A | 7/1998 | Benantar et al. | |
| 5,842,017 A | 11/1998 | Hookway et al. | |
| 5,873,086 A | 2/1999 | Fujii et al. | |
| 5,884,298 A | 3/1999 | Smith, II et al. | |
| 5,907,709 A | 5/1999 | Cantey et al. | |
| 5,907,860 A | 5/1999 | Garibay et al. | |
| 5,926,832 A | 7/1999 | Wing et al. | |
| 5,944,839 A | 8/1999 | Isenberg | |
| 5,974,149 A | 10/1999 | Leppek | |
| 5,987,557 A * | 11/1999 | Ebrahim | G06F 12/1483 710/200 |
| 5,987,610 A | 11/1999 | Franczek et al. | |
| 5,987,611 A | 11/1999 | Freund | |
| 5,991,881 A | 11/1999 | Conklin et al. | |
| 6,064,815 A | 5/2000 | Hohensee et al. | |
| 6,073,142 A | 6/2000 | Geiger et al. | |
| 6,141,698 A | 10/2000 | Krishnan et al. | |
| 6,182,142 B1 | 1/2001 | Win et al. | |
| 6,192,401 B1 | 2/2001 | Modiri et al. | |
| 6,192,475 B1 | 2/2001 | Wallace | |
| 6,256,773 B1 | 7/2001 | Bowman-Amuah | |
| 6,275,938 B1 | 8/2001 | Bond et al. | |
| 6,321,267 B1 | 11/2001 | Donaldson | |
| 6,338,149 B1 | 1/2002 | Ciccone, Jr. et al. | |
| 6,356,957 B2 | 3/2002 | Sanchez, II et al. | |
| 6,393,465 B2 | 5/2002 | Leeds | |
| 6,442,686 B1 | 8/2002 | McArdle et al. | |
| 6,449,040 B1 | 9/2002 | Fujita | |
| 6,453,468 B1 | 9/2002 | D'Souza | |
| 6,460,050 B1 | 10/2002 | Pace et al. | |
| 6,496,477 B1 | 12/2002 | Perkins et al. | |
| 6,587,877 B1 | 7/2003 | Douglis et al. | |
| 6,611,925 B1 | 8/2003 | Spear | |
| 6,658,645 B1 | 12/2003 | Akuta et al. | |
| 6,662,219 B1 | 12/2003 | Nishanov et al. | |
| 6,748,534 B1 | 6/2004 | Gryaznov et al. | |
| 6,769,008 B1 | 7/2004 | Kumar et al. | |
| 6,769,115 B1 | 7/2004 | Oldman | |
| 6,795,966 B1 | 9/2004 | Lim et al. | |
| 6,832,227 B2 | 12/2004 | Seki et al. | |
| 6,834,301 B1 | 12/2004 | Hanchett | |
| 6,847,993 B1 | 1/2005 | Novaes et al. | |
| 6,907,600 B2 | 6/2005 | Neiger et al. | |
| 6,918,110 B2 | 7/2005 | Hundt et al. | |
| 6,930,985 B1 | 8/2005 | Rathi et al. | |
| 6,934,755 B1 | 8/2005 | Saulpaugh et al. | |
| 6,941,470 B1 | 9/2005 | Jooste | |
| 6,988,101 B2 | 1/2006 | Ham et al. | |
| 6,988,124 B2 | 1/2006 | Douceur et al. | |
| 7,007,302 B1 | 2/2006 | Jagger et al. | |
| 7,010,796 B1 | 3/2006 | Strom et al. | |
| 7,024,548 B1 | 4/2006 | O'Toole, Jr. | |
| 7,039,949 B2 | 5/2006 | Cartmell et al. | |
| 7,054,930 B1 | 5/2006 | Cheriton | |
| 7,065,767 B2 | 6/2006 | Kambhammettu et al. | |
| 7,069,330 B1 | 6/2006 | McArdle et al. | |
| 7,082,456 B2 | 7/2006 | Mani-Meitav et al. | |
| 7,093,239 B1 | 8/2006 | van der Made | |
| 7,096,500 B2 | 8/2006 | Roberts et al. | |
| 7,124,409 B2 | 10/2006 | Davis et al. | |
| 7,139,916 B2 | 11/2006 | Billingsley et al. | |
| 7,152,148 B2 | 12/2006 | Williams et al. | |
| 7,159,036 B2 | 1/2007 | Hinchliffe et al. | |
| 7,177,267 B2 | 2/2007 | Oliver et al. | |
| 7,203,864 B2 | 4/2007 | Goin et al. | |
| 7,251,655 B2 | 7/2007 | Kaler et al. | |
| 7,290,266 B2 | 10/2007 | Gladstone et al. | |
| 7,302,558 B2 | 11/2007 | Campbell et al. | |
| 7,330,849 B2 | 2/2008 | Gerasoulis et al. | |
| 7,340,684 B2 | 3/2008 | Ramamoorthy et al. | |
| 7,346,781 B2 | 3/2008 | Cowle et al. | |
| 7,349,931 B2 | 3/2008 | Horne | |
| 7,350,204 B2 | 3/2008 | Lambert et al. | |
| 7,353,501 B2 | 4/2008 | Tang et al. | |
| 7,360,097 B2 | 4/2008 | Rothstein | |
| 7,363,022 B2 | 4/2008 | Whelan et al. | |
| 7,370,360 B2 | 5/2008 | van der Made | |
| 7,385,938 B1 | 6/2008 | Beckett et al. | |
| 7,406,517 B2 | 7/2008 | Hunt et al. | |
| 7,441,265 B2 | 10/2008 | Staamann et al. | |
| 7,463,590 B2 | 12/2008 | Mualem et al. | |
| 7,464,408 B1 | 12/2008 | Shah et al. | |
| 7,506,155 B1 | 3/2009 | Stewart et al. | |
| 7,506,170 B2 | 3/2009 | Finnegan | |
| 7,506,364 B2 | 3/2009 | Vayman | |
| 7,546,333 B2 | 6/2009 | Alon et al. | |
| 7,546,594 B2 | 6/2009 | McGuire et al. | |
| 7,552,479 B1 | 6/2009 | Conover et al. | |
| 7,577,995 B2 | 8/2009 | Chebolu et al. | |
| 7,603,552 B1 | 10/2009 | Sebes et al. | |
| 7,607,170 B2 | 10/2009 | Chesla | |
| 7,657,599 B2 | 2/2010 | Smith | |
| 7,669,195 B1 | 2/2010 | Qumei | |
| 7,685,635 B2 | 3/2010 | Vega et al. | |
| 7,694,150 B1 | 4/2010 | Kirby | |
| 7,698,744 B2 | 4/2010 | Fanton et al. | |
| 7,703,090 B2 | 4/2010 | Napier et al. | |
| 7,739,497 B1 | 6/2010 | Fink et al. | |
| 7,757,269 B1 | 7/2010 | Roy-Chowdhury et al. | |
| 7,765,538 B2 | 7/2010 | Zweifel et al. | |
| 7,783,735 B1 | 8/2010 | Sebes et al. | |
| 7,809,704 B2 | 10/2010 | Surendran et al. | |
| 7,814,554 B1 | 10/2010 | Ragner | |
| 7,818,377 B2 | 10/2010 | Whitney et al. | |
| 7,823,148 B2 | 10/2010 | Deshpande et al. | |
| 7,836,504 B2 | 11/2010 | Ray et al. | |
| 7,840,968 B1 | 11/2010 | Sharma et al. | |
| 7,849,507 B1 | 12/2010 | Bloch et al. | |
| 7,853,643 B1 | 12/2010 | Martinez et al. | |
| 7,856,661 B1 | 12/2010 | Sebes et al. | |
| 7,865,931 B1 | 1/2011 | Stone et al. | |
| 7,870,387 B1 | 1/2011 | Bhargava et al. | |
| 7,873,955 B1 | 1/2011 | Sebes et al. | |
| 7,895,573 B1 | 2/2011 | Bhargava et al. | |
| 7,908,653 B2 | 3/2011 | Brickell et al. | |
| 7,925,722 B1 | 4/2011 | Reed et al. | |
| 7,937,455 B2 | 5/2011 | Saha et al. | |
| 7,950,056 B1 | 5/2011 | Satish et al. | |
| 7,966,659 B1 | 6/2011 | Wilkinson et al. | |
| 7,996,836 B1 | 8/2011 | McCorkendale et al. | |
| 8,015,388 B1 | 9/2011 | Rihan et al. | |
| 8,015,563 B2 | 9/2011 | Araujo et al. | |
| 8,028,340 B2 | 9/2011 | Sebes et al. | |
| 8,055,904 B1 | 11/2011 | Cato et al. | |
| 8,166,474 B1 * | 4/2012 | Delco | G06F 9/45558 709/226 |
| 8,195,931 B1 | 6/2012 | Sharma et al. | |
| 8,205,188 B2 | 6/2012 | Ramamoorthy et al. | |
| 8,209,680 B1 | 6/2012 | Le et al. | |
| 8,234,709 B2 | 7/2012 | Viljoen et al. | |
| 8,234,713 B2 | 7/2012 | Roy-Chowdhury et al. | |
| 8,307,437 B2 | 11/2012 | Sebes et al. | |
| 8,321,932 B2 | 11/2012 | Bhargava et al. | |
| 8,332,929 B1 | 12/2012 | Bhargava et al. | |
| 8,352,930 B1 | 1/2013 | Sebes et al. | |
| 8,381,284 B2 | 2/2013 | Dang et al. | |
| 8,387,046 B1 | 2/2013 | Montague et al. | |
| 8,515,075 B1 | 8/2013 | Saraf et al. | |
| 8,539,063 B1 | 9/2013 | Sharma et al. | |
| 8,544,003 B1 | 9/2013 | Sawhney et al. | |
| 8,549,003 B1 | 10/2013 | Bhargava et al. | |
| 8,549,546 B2 | 10/2013 | Sharma et al. | |
| 8,555,404 B1 | 10/2013 | Sebes et al. | |
| 8,561,051 B2 | 10/2013 | Sebes et al. | |
| 8,561,082 B2 | 10/2013 | Sharma et al. | |
| 8,584,199 B1 | 11/2013 | Chen et al. | |
| 8,701,182 B2 | 4/2014 | Bhargava et al. | |
| 8,707,422 B2 | 4/2014 | Bhargava et al. | |
| 8,707,446 B2 | 4/2014 | Roy-Chowdhury et al. | |
| 8,713,668 B2 | 4/2014 | Cooper et al. | |
| 8,762,928 B2 | 6/2014 | Sharma et al. | |
| 8,763,118 B2 | 6/2014 | Sebes et al. | |
| 8,793,489 B2 | 7/2014 | Polunin et al. | |

(56) References Cited

U.S. PATENT DOCUMENTS

| | | |
|---|---|---|
| 8,800,024 B2 | 8/2014 | Cooper et al. |
| 8,843,903 B1 | 9/2014 | Blaser et al. |
| 8,869,265 B2 | 10/2014 | Dang et al. |
| 8,904,520 B1 | 12/2014 | Nachenberg et al. |
| 8,925,101 B2 | 12/2014 | Bhargava et al. |
| 8,938,800 B2 | 1/2015 | Bhargava et al. |
| 8,973,146 B2 | 3/2015 | Ramanan et al. |
| 9,112,830 B2 | 8/2015 | Cooper et al. |
| 9,134,998 B2 | 9/2015 | Roy-Chowdhury et al. |
| 2002/0056076 A1 | 5/2002 | van der Made |
| 2002/0069367 A1 | 6/2002 | Tindal et al. |
| 2002/0083175 A1 | 6/2002 | Afek et al. |
| 2002/0099671 A1 | 7/2002 | Mastin Crosbie et al. |
| 2002/0114319 A1 | 8/2002 | Liu et al. |
| 2002/0118644 A1* | 8/2002 | Moir ............... H04L 12/2856 370/230.1 |
| 2003/0014667 A1 | 1/2003 | Kolichtchak |
| 2003/0023736 A1 | 1/2003 | Abkemeier |
| 2003/0033510 A1 | 2/2003 | Dice |
| 2003/0061506 A1* | 3/2003 | Cooper ............... H04L 12/2602 726/4 |
| 2003/0065945 A1 | 4/2003 | Lingafelt et al. |
| 2003/0073894 A1 | 4/2003 | Chiang et al. |
| 2003/0074552 A1 | 4/2003 | Olkin et al. |
| 2003/0088680 A1 | 5/2003 | Nachenberg et al. |
| 2003/0115222 A1 | 6/2003 | Oashi et al. |
| 2003/0120601 A1 | 6/2003 | Ouye et al. |
| 2003/0120811 A1 | 6/2003 | Hanson et al. |
| 2003/0120935 A1 | 6/2003 | Teal et al. |
| 2003/0145232 A1 | 7/2003 | Poletto et al. |
| 2003/0163718 A1 | 8/2003 | Johnson et al. |
| 2003/0167292 A1 | 9/2003 | Ross |
| 2003/0167399 A1 | 9/2003 | Audebert et al. |
| 2003/0200332 A1 | 10/2003 | Gupta et al. |
| 2003/0212902 A1 | 11/2003 | van der Made |
| 2003/0220944 A1 | 11/2003 | Schottland et al. |
| 2003/0221190 A1 | 11/2003 | Deshpande et al. |
| 2004/0003258 A1 | 1/2004 | Billingsley et al. |
| 2004/0015554 A1 | 1/2004 | Wilson |
| 2004/0051736 A1 | 3/2004 | Daniell |
| 2004/0054928 A1 | 3/2004 | Hall |
| 2004/0057454 A1 | 3/2004 | Hennegan et al. |
| 2004/0088398 A1 | 5/2004 | Barlow |
| 2004/0139206 A1 | 7/2004 | Claudatos et al. |
| 2004/0143749 A1 | 7/2004 | Tajalli et al. |
| 2004/0153650 A1 | 8/2004 | Hillmer |
| 2004/0167906 A1 | 8/2004 | Smith et al. |
| 2004/0172551 A1 | 9/2004 | Fielding et al. |
| 2004/0230963 A1 | 11/2004 | Rothman et al. |
| 2004/0243678 A1 | 12/2004 | Smith et al. |
| 2004/0255161 A1 | 12/2004 | Cavanaugh |
| 2004/0268149 A1 | 12/2004 | Aaron |
| 2005/0005006 A1 | 1/2005 | Chauffour et al. |
| 2005/0018651 A1 | 1/2005 | Yan et al. |
| 2005/0022014 A1 | 1/2005 | Shipman |
| 2005/0071633 A1 | 3/2005 | Rothstein |
| 2005/0086047 A1 | 4/2005 | Uchimoto et al. |
| 2005/0091321 A1 | 4/2005 | Daniell et al. |
| 2005/0091487 A1 | 4/2005 | Cross et al. |
| 2005/0108516 A1 | 5/2005 | Balzer et al. |
| 2005/0108562 A1 | 5/2005 | Khazan et al. |
| 2005/0114672 A1 | 5/2005 | Duncan et al. |
| 2005/0132346 A1 | 6/2005 | Tsantilis |
| 2005/0198519 A1 | 9/2005 | Tamura et al. |
| 2005/0228990 A1 | 10/2005 | Kato et al. |
| 2005/0235360 A1 | 10/2005 | Pearson |
| 2005/0256907 A1 | 11/2005 | Novik et al. |
| 2005/0257207 A1 | 11/2005 | Blumfield et al. |
| 2005/0257265 A1 | 11/2005 | Cook et al. |
| 2005/0260996 A1 | 11/2005 | Groenendaal |
| 2005/0262558 A1 | 11/2005 | Usov |
| 2005/0273858 A1 | 12/2005 | Zadok et al. |
| 2005/0283823 A1 | 12/2005 | Okajo et al. |
| 2005/0289538 A1 | 12/2005 | Black-Ziegelbein et al. |
| 2006/0004875 A1 | 1/2006 | Baron et al. |
| 2006/0015501 A1 | 1/2006 | Sanamrad et al. |
| 2006/0037016 A1 | 2/2006 | Saha et al. |
| 2006/0072451 A1 | 4/2006 | Ross |
| 2006/0075299 A1 | 4/2006 | Chandramouleeswaran et al. |
| 2006/0075478 A1* | 4/2006 | Hyndman ............ H04L 63/0218 726/11 |
| 2006/0080656 A1 | 4/2006 | Cain et al. |
| 2006/0085785 A1 | 4/2006 | Garrett |
| 2006/0101277 A1 | 5/2006 | Meenan et al. |
| 2006/0133223 A1 | 6/2006 | Nakamura et al. |
| 2006/0136910 A1 | 6/2006 | Brickell et al. |
| 2006/0136911 A1 | 6/2006 | Robinson et al. |
| 2006/0143713 A1 | 6/2006 | Challener et al. |
| 2006/0195906 A1 | 8/2006 | Jin et al. |
| 2006/0200863 A1 | 9/2006 | Ray et al. |
| 2006/0230314 A1 | 10/2006 | Sanjar et al. |
| 2006/0236398 A1 | 10/2006 | Trakic et al. |
| 2006/0259734 A1 | 11/2006 | Sheu et al. |
| 2006/0277603 A1 | 12/2006 | Kelso et al. |
| 2007/0011746 A1 | 1/2007 | Malpani et al. |
| 2007/0028303 A1 | 2/2007 | Brennan |
| 2007/0033645 A1 | 2/2007 | Jones |
| 2007/0039049 A1 | 2/2007 | Kupferman et al. |
| 2007/0050579 A1 | 3/2007 | Hall et al. |
| 2007/0050764 A1 | 3/2007 | Traut |
| 2007/0074199 A1 | 3/2007 | Schoenberg |
| 2007/0083522 A1 | 4/2007 | Nord et al. |
| 2007/0101435 A1 | 5/2007 | Konanka et al. |
| 2007/0136579 A1 | 6/2007 | Levy et al. |
| 2007/0143851 A1 | 6/2007 | Nicodemus et al. |
| 2007/0157303 A1 | 7/2007 | Pankratov |
| 2007/0169079 A1 | 7/2007 | Keller et al. |
| 2007/0192329 A1 | 8/2007 | Croft et al. |
| 2007/0220061 A1 | 9/2007 | Tirosh et al. |
| 2007/0220507 A1 | 9/2007 | Back et al. |
| 2007/0253430 A1 | 11/2007 | Minami et al. |
| 2007/0256138 A1 | 11/2007 | Gadea et al. |
| 2007/0271561 A1 | 11/2007 | Winner et al. |
| 2007/0297333 A1* | 12/2007 | Zuk ............... H04L 63/1416 370/235 |
| 2007/0297396 A1 | 12/2007 | Eldar et al. |
| 2007/0300215 A1 | 12/2007 | Bardsley |
| 2008/0005737 A1 | 1/2008 | Saha et al. |
| 2008/0005798 A1 | 1/2008 | Ross |
| 2008/0010304 A1 | 1/2008 | Vempala et al. |
| 2008/0022384 A1 | 1/2008 | Yee et al. |
| 2008/0034416 A1 | 2/2008 | Kumar et al. |
| 2008/0034418 A1 | 2/2008 | Venkatraman et al. |
| 2008/0052468 A1 | 2/2008 | Speirs et al. |
| 2008/0059123 A1 | 3/2008 | Estberg et al. |
| 2008/0082662 A1 | 4/2008 | Dandliker et al. |
| 2008/0082977 A1 | 4/2008 | Araujo et al. |
| 2008/0086513 A1* | 4/2008 | O'Brien ............... G06F 21/554 |
| 2008/0115012 A1 | 5/2008 | Jann et al. |
| 2008/0120499 A1 | 5/2008 | Zimmer et al. |
| 2008/0141371 A1 | 6/2008 | Bradicich et al. |
| 2008/0163207 A1 | 7/2008 | Reumann et al. |
| 2008/0163210 A1 | 7/2008 | Bowman et al. |
| 2008/0165952 A1 | 7/2008 | Smith et al. |
| 2008/0184373 A1 | 7/2008 | Traut et al. |
| 2008/0235534 A1 | 9/2008 | Schunter et al. |
| 2008/0282080 A1 | 11/2008 | Hyndman et al. |
| 2008/0294703 A1 | 11/2008 | Craft et al. |
| 2008/0295173 A1 | 11/2008 | Tsvetanov |
| 2008/0301770 A1 | 12/2008 | Kinder |
| 2008/0307524 A1 | 12/2008 | Singh et al. |
| 2009/0007100 A1 | 1/2009 | Field et al. |
| 2009/0038017 A1 | 2/2009 | Durham et al. |
| 2009/0043993 A1 | 2/2009 | Ford et al. |
| 2009/0055693 A1 | 2/2009 | Budko et al. |
| 2009/0063665 A1 | 3/2009 | Bagepalli et al. |
| 2009/0113110 A1 | 4/2009 | Chen et al. |
| 2009/0144300 A1 | 6/2009 | Chatley et al. |
| 2009/0150639 A1 | 6/2009 | Ohata |
| 2009/0178110 A1 | 7/2009 | Higuchi |
| 2009/0220080 A1 | 9/2009 | Herne et al. |
| 2009/0249053 A1 | 10/2009 | Zimmer et al. |
| 2009/0249438 A1 | 10/2009 | Litvin et al. |
| 2009/0320010 A1 | 12/2009 | Chow et al. |

(56) References Cited

U.S. PATENT DOCUMENTS

| | | |
|---|---|---|
| 2009/0320133 A1 | 12/2009 | Viljoen et al. |
| 2009/0320140 A1 | 12/2009 | Sebes et al. |
| 2009/0328144 A1 | 12/2009 | Sherlock et al. |
| 2009/0328185 A1 | 12/2009 | van den Berg et al. |
| 2010/0049973 A1 | 2/2010 | Chen |
| 2010/0071035 A1 | 3/2010 | Budko et al. |
| 2010/0100970 A1 | 4/2010 | Roy-Chowdhury et al. |
| 2010/0114825 A1 | 5/2010 | Siddegowda |
| 2010/0138430 A1 | 6/2010 | Gotou |
| 2010/0188976 A1 | 7/2010 | Rahman et al. |
| 2010/0250895 A1 | 9/2010 | Adams et al. |
| 2010/0281133 A1 | 11/2010 | Brendel |
| 2010/0293225 A1 | 11/2010 | Sebes et al. |
| 2010/0299277 A1 | 11/2010 | Emelo et al. |
| 2010/0332910 A1 | 12/2010 | Ali et al. |
| 2011/0029772 A1 | 2/2011 | Fanton et al. |
| 2011/0035423 A1 | 2/2011 | Kobayashi et al. |
| 2011/0047542 A1 | 2/2011 | Dang et al. |
| 2011/0047543 A1 | 2/2011 | Mohinder |
| 2011/0061092 A1* | 3/2011 | Bailloeul ............ G06F 3/002 726/4 |
| 2011/0077948 A1 | 3/2011 | Sharma et al. |
| 2011/0078550 A1 | 3/2011 | Nabutovsky |
| 2011/0093842 A1 | 4/2011 | Sebes |
| 2011/0093950 A1 | 4/2011 | Bhargava et al. |
| 2011/0113467 A1 | 5/2011 | Agarwal et al. |
| 2011/0119760 A1 | 5/2011 | Sebes et al. |
| 2011/0138461 A1 | 6/2011 | Bhargava et al. |
| 2011/0246753 A1 | 10/2011 | Thomas |
| 2011/0302647 A1 | 12/2011 | Bhattacharya et al. |
| 2012/0030731 A1 | 2/2012 | Bhargava et al. |
| 2012/0030750 A1 | 2/2012 | Bhargava et al. |
| 2012/0110666 A1 | 5/2012 | Ogilvie |
| 2012/0159631 A1 | 6/2012 | Niemela et al. |
| 2012/0216271 A1 | 8/2012 | Cooper et al. |
| 2012/0233611 A1 | 9/2012 | Voccio |
| 2012/0278853 A1 | 11/2012 | Roy-Chowdhury et al. |
| 2012/0290827 A1 | 11/2012 | Bhargava et al. |
| 2012/0290828 A1 | 11/2012 | Bhargava et al. |
| 2012/0297176 A1 | 11/2012 | Bhargava et al. |
| 2013/0024934 A1 | 1/2013 | Sebes et al. |
| 2013/0091318 A1 | 4/2013 | Bhattacharjee et al. |
| 2013/0097355 A1 | 4/2013 | Dang et al. |
| 2013/0097356 A1 | 4/2013 | Dang et al. |
| 2013/0097658 A1 | 4/2013 | Cooper et al. |
| 2013/0097692 A1 | 4/2013 | Cooper et al. |
| 2013/0117823 A1 | 5/2013 | Dang et al. |
| 2013/0179971 A1 | 7/2013 | Harrison |
| 2013/0227683 A1 | 8/2013 | Bettini et al. |
| 2013/0246044 A1 | 9/2013 | Sharma et al. |
| 2013/0246393 A1 | 9/2013 | Saraf et al. |
| 2013/0246423 A1 | 9/2013 | Bhargava et al. |
| 2013/0246685 A1 | 9/2013 | Bhargava et al. |
| 2013/0247016 A1 | 9/2013 | Sharma et al. |
| 2013/0247027 A1 | 9/2013 | Shah et al. |
| 2013/0247032 A1 | 9/2013 | Bhargava et al. |
| 2013/0247181 A1 | 9/2013 | Saraf et al. |
| 2013/0247192 A1 | 9/2013 | Krasser et al. |
| 2013/0247201 A1 | 9/2013 | Alperovitch et al. |
| 2013/0247226 A1 | 9/2013 | Sebes et al. |
| 2013/0268994 A1 | 10/2013 | Cooper et al. |
| 2014/0090061 A1 | 3/2014 | Avasarala et al. |
| 2014/0101783 A1 | 4/2014 | Bhargava et al. |
| 2014/0189859 A1 | 7/2014 | Ramanan et al. |
| 2014/0237584 A1 | 8/2014 | Cooper et al. |
| 2014/0283065 A1 | 9/2014 | Teddy et al. |
| 2014/0283066 A1 | 9/2014 | Teddy et al. |
| 2014/0317592 A1 | 10/2014 | Roy-Chowdhury et al. |
| 2014/0351895 A1 | 11/2014 | Bhargava et al. |
| 2015/0121449 A1 | 4/2015 | Cp |
| 2015/0180884 A1 | 6/2015 | Bhargava et al. |
| 2015/0180997 A1 | 6/2015 | Ramanan et al. |
| 2015/0200968 A1 | 7/2015 | Bhargava et al. |
| 2015/0365380 A1 | 12/2015 | Cooper et al. |

FOREIGN PATENT DOCUMENTS

| | | |
|---|---|---|
| CN | 101218568 A | 7/2008 |
| CN | 101569129 | 10/2009 |
| CN | 101636998 A | 1/2010 |
| CN | 103283202 A | 9/2013 |
| EP | 1 482 394 A2 | 12/2004 |
| EP | 2 037 657 A1 | 3/2009 |
| EP | 2599026 | 6/2013 |
| EP | 2599276 | 6/2013 |
| JP | 2004/524598 A | 8/2004 |
| JP | 2005-275839 | 6/2005 |
| JP | 2005-202523 | 7/2005 |
| JP | 2006-59217 | 3/2006 |
| JP | 2006-302292 | 11/2006 |
| JP | 2007-500396 | 1/2007 |
| JP | 2008-506303 | 2/2008 |
| JP | 2008-217306 | 9/2008 |
| JP | 2009-510858 | 3/2009 |
| JP | 2010-16834 | 1/2010 |
| WO | WO 98/44404 | 10/1998 |
| WO | WO 01/84285 A2 | 11/2001 |
| WO | WO 2006/012197 A2 | 2/2006 |
| WO | WO 2006/124832 A1 | 11/2006 |
| WO | WO 2007/016478 A2 | 2/2007 |
| WO | WO 2008/054997 A2 | 5/2008 |
| WO | WO 2011/003958 A1 | 1/2011 |
| WO | WO 2011/059877 | 5/2011 |
| WO | WO 2012/015485 | 2/2012 |
| WO | WO 2012/015489 | 2/2012 |
| WO | WO 2012/116098 | 8/2012 |
| WO | WO 2013/058940 | 4/2013 |
| WO | WO 2013/058944 | 4/2013 |
| WO | WO 2014/105308 A1 | 7/2014 |
| WO | WO 2015/060857 A1 | 4/2015 |

OTHER PUBLICATIONS

Eli M. Dow, et al., "The Xen Hypervisor," INFORMIT, dated Apr. 10, 2008, http://www.informit.com/articles/printerfriendly.aspx?p=1187966, printed Aug. 11, 2009 (13 pages).

Desktop Management and Control, Website: http://www.vmware.com/solutions/desktop/, printed Oct. 12, 2009, 1 page.

Secure Mobile Computing, Website: http://www.vmware.com/solutions/desktop/mobile.html, printed Oct. 12, 2009, 2 pages.

Barrantes et al., "Randomized Instruction Set Emulation to Dispurt Binary Code Injection Attacks," Oct. 27-31, 2003, ACM, pp. 281-289.

Gaurav et al., "Countering Code-Injection Attacks with Instruction-Set Randomization," Oct. 27-31, 2003, ACM, pp. 272-280.

Check Point Software Technologies Ltd.: "ZoneAlarm Security Software User Guide Version 9", Aug. 24, 2009, XP002634548, 259 pages, retrieved from Internet: URL:http://download.zonealarm.com/bin/media/pdf/zaclient91_user_manual.pdf.

Notification of Transmittal of the International Search Report and the Written Opinion of the International Searching Authority (1 page), International Search Report (4 pages), and Written Opinion (3 pages), mailed Mar. 2, 2011, International Application No. PCT/US2010/055520.

Notification of Transmittal of the International Search Report and the Written Opinion of the International Searching Authority, or the Declaration (1 page), International Search Report (6 pages), and Written Opinion of the International Searching Authority (10 pages) for International Application No. PCT/US2011/020677 mailed Jul. 22, 2011.

Notification of Transmittal of the International Search Report and Written Opinion of the International Searching Authority, or the Declaration (1 page), International Search Report (3 pages), and Written Opinion of the International Search Authority (6 pages) for International Application No. PCT/US2011/024869 mailed Jul. 14, 2011.

Tal Garfinkel, et al., "Terra: A Virtual Machine-Based Platform for Trusted Computing," XP-002340992, SOSP'03, Oct. 19-22, 2003, 14 pages.

(56) References Cited

OTHER PUBLICATIONS

IA-32 Intel® Architecture Software Developer's Manual, vol. 3B; Jun. 2006; pp. 13, 15, 22 and 145-146.
Notification of International Preliminary Report on Patentability and Written Opinion mailed May 24, 2012 for International Application No. PCT/US2010/055520, 5 pages.
Sailer et al., sHype: Secure Hypervisor Approach to Trusted Virtualized Systems, IBM research Report, Feb. 2, 2005, 13 pages.
Kurt Gutzmann, "Access Control and Session Management in the HTTP Environment," Jan./Feb. 2001, pp. 26-35, IEEE Internet Computing.
"Apache Hadoop Project," http://hadoop.apache.org/, retrieved and printed Jan. 26, 2011, 3 pages.
"Cbl, composite blocking list," http://cbl.abuseat.org, retrieved and printed Jan. 26, 2011, 8 pages.
A Tutorial on Clustering Algorithms, retrieved Sep. 10, 2010 from http://home.dei.polimi.it/matteucc/clustering/tutorial.html, 6 pages.
A. Pitsillidis, K. Levchenko, C. Kreibich, C. Kanich, G.M. Voelker, V. Pason, N. Weaver, and S. Savage, "Botnet Judo: Fighting Spam with Itself," in Proceedings of the 17th Annual Network and Distributed System Security Symposium (NDSS'10), Feb. 2010, 19 pages.
A. Ramachandran, N. Feamster, and D. Dagon, "Revealing botnet membership using DNSBL counter-intelligence," in Proceedings of the 2nd USENIX Steps to Reducing Unwanted Traffic on the Internet, 2006, 6 pages.
A. Ramachandran, N. Feamster, and S. Vempala, "Filtering Spam with Behavioral Blacklisting," in *Proceedings of ACM Conference on Computer Communications Security*, 2007, 10 pages.
B. Stone-Gross, M. Cova, L. Cavallor, B. Gilbert, M. Szydlowski, R. Kemmerer, C. Kruegel, and G. Vigna, "Your Botnet is My Botnet: Analysis of a Botnet Takeover," in Proceedings of the 16th ACM Conference on Computer and Communicatinos Security, 2009, 13 pages.
C. Kanich, C. Kreibich, K. Levchenko, B. Enright, G.M. Voelker, V. Paxson, and S. Savage, "Spamalytics: An Empirical Analysis of Spam Marketing Conversion," in Proceedings of the 15th ACM conference on Computer and Communications Security, 2008, 12 pages.
C.J. Burges, "A Tutorial on Support Vector Machines for Pattern Recognition," in *Journal of Data Mining and Knowledge Discovery*, 1998, 43 pages.
E-Mail Spamming Botnets: Signatures and Characteristics, Posted Sep. 22, 2008, http://www.protofilter.com/blog/email-spam-botnets-signatures.html, retrieved and printed Feb. 2, 2011, 4 pages.
G. Gu, J. Zhang, and W. Lee, "BotSniffer: Detecting Botnet Command and Control Channels in Network Traffic," in Proceedings of the 15th Annual Network and Distributed System Security Symposium (NDSS'08), Feb. 2008, 24 pages.
G. Gu, P. Porras, V. Yegneswaran, M. Fong, and W. Lee, "BotHunter: Detecting Malware Infection Through IDS-Driven Dialog Correlation," in Proceedings of the 16th USNIX Security Symposium, 2007, 34 pages.
G. Gu, R. Perdisci, J. Zhang, and W. Lee, "BotMiner: Clustering Analysis of Network Traffic for Protocol and Structure-Independent Botnet Detection," in Proceedings of the 17th USENIX Security Symposium, 2008, 15 pages.
I. Jolliffe, "Principal Component Analysis," in *Springer Series in Statistics, Statistical Theory and Methods*, 2nd ed.), 2002, 518 pages.
J. Dean and S. Ghemawat, "MapReduce: Simplified Data Processing on Large Clusters," in *Proceedings of Sixth Symposium on Operating System Design and Implementation, OSDI*, 2004, 13 pages.
J. Goebel and T. Holz, "Rishi: Identify Bot Contaminated Hosts by IRC Nickname Evaluation," in *Proceedings of the USENIX HotBots*, 2007, 12 pages.
J.B. Grizzard, V. Sharma, C. Nunnery, B.B. Kang, and D. Dagon, "Peer-to-Peer Botnets: Overview and Case Study," in Proceedings of the 1st Workshop on Hot Topics in Understanding Botnets, Apr. 2007, 14 pages.
J.P. John, A. Moshchuk, S.D. Gribble, and A. Krishnamurthy, "Studying Spamming Botnets Using Botlab," in Proceedings of the 6th USENIX Symposium on Networked Systems Design and Implementation, 2009, 16 pages.
K. Li, Z. Zhong, and L. Ramaswamy, "Privacy-Aware Collaborative Spam Filtering," in *Journal of IEEE Transactions on Parallel and Distributed Systems*, vol. 29, No. 5, May 2009, pp. 725-739.
L. Zhuang, J. Dunagan, D.R. Simon, H.J. Wang, and J.D. Tygar, "Characterizing botnets from email spam records," in Proceedings of the 1st Usenix Workshop on Large-Scale Exploits and Emergent Threats), 2008, 18 pages.
M. Frigo and S.G. Johnson, "The Design and Implementation of FFTW3," in Proceedings of the IEEE 93(2), Invited paper, Special Issue on Program Generation, Optimization, and Platform Adaptation, 2005, 16 pages.
R. Perdisci, I. Corona, D. Dagon, and W. Lee, "Detecting Malicious Flux Service Networks through Passive Analysis of Recursive DNS Traces," in Proceedings of the 25th Annual Computer Security Applications Conference (ACSAC 2009), Dec. 2009, 10 pages.
X. Jiang, D. Xu, and Y.-M. Wang, "Collapsar: A VM-Based Honeyfarm and Reverse Honeyfarm Architecture for Network Attack Capture and Detention," in Journal of Parallel and Distributed Computing, Special Issue on Security in Grid and Distributed Systems, 2006, 16 pages.
Y. Tang, S. Krasser, P. Judge, and Y.-Q. Zhang, "Fast and Effective Spam Sender Detection with Granular SVM on Highly Imbalanced Mail Server Behavior Data," in Proceedings of 2nd International Conference on Collaborative Computing: Networking, Applications and Worksharing (CollaborativeCom), Nov. 2006, 6 pages.
Y. Zhao, Y. Xie, F. Yu, Q. Ke, Y. Yu, Y. Chen, and E. Gillum, "BotGraph: Large Scale Spamming Botnet Detection," in Proceedings of the 6th USENIX Symposium on Networked Systems Design and Implementation, 2009, 26 pages.
Yinglian Xie, Fang Yu, Kannan Achan, Rina Panigraphy, Geoff Hulten, and Ivan Osipkov, "Spamming Botnets: Signatures and Characteristics," SIGCOMM '08, Aug. 17, 22, 2008, http://ccr.sigcomm.org/online/files/p171-xie.pdf, pp. 171-182.
Z. Li, A. Goyal, Y. Chen, and V. Paxson, "Automating Analysis of Large-Scale Botnet probing Events," in Proceedings of ACM Symposium on Information, Computer and Communications Security (ASIACCS)), 2009, 12 pages.
Myung-Sup Kim et al., "A load cluster management system using SNMP and web", [Online], May 2002, pp. 367-378, [Retrieved from Internet on Oct. 24, 2012], <http://onlinelibrary.wiley.com/doi/10.1002/nem.453/pdf>.
G. Pruett et al., "BladeCenter systems management software", [Online], Nov. 2005, pp. 963-975, [Retrieved from Internet on Oct. 24, 2012], <http://citeseerx.1st.psu.edu/viewdoc/download?doi=10.1.1.91.5091&rep=rep1&type=pdf>.
Philip M. Papadopoulos et al., "NPACI Rocks: tools and techniques for easily deploying manageable Linux clusters" [Online], Aug. 2002, pp. 707-725, [Retrieved from internet on Oct. 24, 2012], <http://onlinelibrary.wiley.com/doi/10.1002/cpe.722/pdf>.
Thomas Staub et al., "Secure Remote Management and Software Distribution for Wireless Mesh Networks", [Online], Sep. 2007, pp. 1-8, [Retrieved from Internet on Oct. 24, 2012], <http://cds.unibe.ch/research/pub_files/B07.pdf>.
"What's New: McAfee VirusScan Enterprise, 8.8," copyright 2010, retrieved on Nov. 23, 2012 at https://kc.mcafee.com/resources/sites/MCAFEE/content/live/PRODUCT_DOCUMENTATION/22000/PD22973/en_US/VSE%208.8%20-%20What's%20New.pdf, 4 pages.
"McAfee Management for Optimized Virtual Environments," copyright 2012, retrieved on Nov. 26, 2012 at AntiVirushttp://www.mcafee.com/us/resources/data-sheets/ds-move-anti-virus.pdf, 2 pages.
Rivest, R., "The MD5 Message-Digest Algorithm", RFC 1321, Apr. 1992, retrieved on Dec. 14, 2012 from http://www.ietf.org/rfc/rfc1321.txt, 21 pages.
Hinden, R. and B. Haberman, "Unique Local IPv6 Unicast Addresses", RFC 4193, Oct. 2005, retrieved on Nov. 20, 2012 from http://tools.ietf.org/pdf/rfc4193.pdf, 17 pages.

(56) References Cited

OTHER PUBLICATIONS

"Secure Hash Standard (SHS)", Federal Information Processing Standards Publication, FIPS PUB 180-4, Mar. 2012, retrieved on Dec. 14, 2012 from http://csrc.nist.gov/publications/fips/fips180-4/fips-180-4.pdf, 35 pages.
U.S. Appl. No. 13/728,705, filed Dec. 27, 2012, entitled "Herd Based Scan Avoidance System in a Network Environment," Inventors Venkata Ramanan, et al.
An Analysis of Address Space Layout Randomization on Windows Vista™, Symantec Advanced Threat Research, copyright 2007 Symantec Corporation, available at http://www.symantec.com/avcenter/reference/Address_Space_Layout_Randomization.pdf, 19 pages.
Bhatkar, et al., "Efficient Techniques for Comprehensive Protection from Memory Error Exploits," USENIX Association, 14th USENIX Security Symposium, Aug. 1-5, 2005, Baltimore, MD, 16 pages.
Dewan, et al., "A Hypervisor-Based System for Protecting Software Runtime Memory and Persistent Storage," Spring Simulation Multiconference 2008, Apr. 14-17, 2008, Ottawa, Canada, (available at website: www.vodun.org/papers/2008_secure_locker_submit_v1-1.pdf, printed Oct. 11, 2011), 8 pages.
Shacham, et al., "On the Effectiveness of Address-Space Randomization," CCS'04, Oct. 25-29, 2004, Washington, D.C., Copyright 2004, 10 pages.
International Search Report and Written Opinion mailed Dec. 14, 2012 for International Application No. PCT/US2012/055674, 9 pages.
International Preliminary Report on Patentability and Written Opinion issued Jan. 29, 2013 for International Application No. PCT/US2011/020677 (9 pages).
International Preliminary Report on Patentability and Written Opinion issued Jan. 29, 2013 for International Application No. PCT/US2011/024869 (6 pages).
Office Action received for U.S. Appl. No. 12/844,892, mailed on Jan. 17, 2013, 29 pages.
Office Action received for U.S. Appl. No. 12/844,892, mailed on Sep. 6, 2012, 33 pages.
Datagram Transport Layer Security Request for Comments 4347, E. Rescorla, et al., Stanford University, Apr. 2006, retrieved and printed on Oct. 17, 2011 from http://tools.ietf.org/pdf/rfc4347.pdf, 26 pages.
Internet Control Message Protocol Request for Comments 792, J. Postel, ISI, Sep. 1981, retrieved and printed on Oct. 17, 2011 from http://tools.ietf.org/html/rfc792, 22 pages.
Mathew J. Schwartz, "Palo Alto Introduces Security for Cloud, Mobile Users," retrieved Feb. 9, 2011 from http://www.informationweek.com/news/security/perimeter/showArticle.jhtml?articleID-22, 4 pages.
Requirements for IV Version 4 Routers Request for Comments 1812, F. Baker, Cisco Systems, Jun. 1995, retrieved and printed on Oct. 17, 2011 from http://tools.ietf.org/pdf/rfc1812.pdf, 176 pages.
The Keyed-Hash Message Authentication Code (HMAC), FIPS PUB 198, Issued Mar. 6, 2002, Federal Information Processing Standards Publication, retrieved and printed on Oct. 17, 2011 from http://csrc.nist.gov/publications/fips/fips198/fips-198a.pdf, 20 pages.
Zhen Chen et al., "Application Level Network Access Control System Based on TNC Architecture for Enterprise Network," in: Wireless communications Networking and Information Security (WCNIS), 2010 IEEE International Conference, Jun. 25-27, 2010 (5 pages).
USPTO Dec. 24, 2012 Nonfinal Office Action from U.S. Appl. No. 13/032,851.
USPTO Mar. 25, 2013 Response to Dec. 24, 2012 Nonfinal Office Action from U.S. Appl. No. 13/032,851.
USPTO Jul. 16, 2013 Final Office Action from U.S. Appl. No. 13/032,851.
International Search Report and Written Opinion, International Application No. PCT/US2012/026169, mailed Jun. 18, 2012, 11 pages.
USPTO Feb. 28, 2013 Nonfinal Office Action from U.S. Appl. No. 13/275,249.
USPTO May 13, 2013 Response to Feb. 28, 2013 Nonfinal Office Action from U.S. Appl. No. 13/275,249.
International Search Report and Written Opinion, International Application No. PCT/US2012/057312, mailed Jan. 31, 2013, 10 pages.
USPTO Mar. 1, 2013 Nonfinal Office Action from U.S. Appl. No. 13/275,196.
International Search Report and Written Opinion, International Application No. PCT/US2012/057153, mailed Dec. 26, 2012, 8 pages.
U.S. Appl. No. 13/437,900, filed Apr. 2, 2012, entitled "System and Method for Interlocking a Host and a Gateway," Inventors: Geoffrey Howard Cooper, et al.
USPTO Mar. 1, 2013 Nonfinal Office Action from U.S. Appl. No. 13/437,900.
USPTO Jun. 3, 2013 Response to Mar. 1, 2013 Nonfinal Office Action from U.S. Appl. No. 13/437,900.
USPTO Sep. 13, 2013 Final Office Action from U.S. Appl. No. 13/275,249, 21 pages.
Narten et al., RFC 4861, "Neighbor Discovery for IP version 6 (IPv6)", Sep. 2007, retrieved from http://tools.ietf.org/html/rfc4861, 194 pages.
International Preliminary Report on Patentability, International Application No. PCT/US2012/026169, mailed Aug. 27, 2013, 8 pages.
USPTO Oct. 2, 2013 Final Office Action from U.S. Appl. No. 13/275,196.
USPTO Oct. 4, 2013 Nonfinal Office Action from U.S. Appl. No. 12/844,892.
USPTO Oct. 25, 2013 Nonfinal Office Action from U.S. Appl. No. 12/844,964.
U.S. Appl. No. 14/045,208, filed Oct. 3, 2013, entitled "Execution Environment File Inventory," Inventors: Rishi Bhargava, et al.
PCT Application Serial No. PCT/US13/66690, filed Oct. 24, 2013, entitled "Agent Assisted Malicious Application Blocking in a Network Environment," 67 pages.
Patent Examination Report No. 1, Australian Application No. 2011283160, mailed Oct. 30, 2013.
USPTO Sep. 27, 2013, Notice of Allowance from U.S. Appl. No. 13/437,900.
PCT Application Serial No. PCT/US13/71327, filed Nov. 21, 2013, entitled "Herd Based Scan Avoidance System in a Network Environment," 46 pages.
USPTO Dec. 4, 2013 Nonfinal Office Action from U.S. Appl. No. 13/032,851.
U.S. Appl. No. 14/127,395, entitled "Agent Assisted Malicious Application Blocking in a Network Environment," filed Dec. 18, 2013, Inventors: Chandan CP et al., 76 pages.
USPTO Dec. 26, 2013 Notice of Allowance from U.S. Appl. No. 13/275,249, 32 pages.
USPTO Dec. 16, 2013 Notice of Allowance from U.S. Appl. No. 13/275,196, 11 pages.
USPTO Jan. 13, 2014 Notice of Allowance from U.S. Appl. No. 13/437,900, 30 pages.
Patent Examination Report No. 1, Australian Application No. 2011283164, mailed Jan. 14, 2014, 6 pages.
USPTO Dec. 30, 2013 Final Office Action from U.S. Appl. No. 13/629,765, 9 pages.
USPTO Feb. 24, 2014 Notice of Allowance from U.S. Appl. No. 13/629,765, 8 pages.
USPTO Mar. 24, 2014 Notice of Allowance from U.S. Appl. No. 13/275,196, 9 pages.
International Search Report and Written Opinion, International Application No. PCT/US2013/071327, mailed Mar. 7, 2014, 12 pages.
USPTO Apr. 15, 2014 Notice of Allowance from U.S. Appl. No. 12/844,892, 9 pages.
U.S. Appl. No. 14/257,770, entitled "Enforcing Alignment of Approved Changes and Deployed Changes in the Software Change Life-Cycle," filed Apr. 21, 2014, Inventors: Rahul Roy-Chowdhury et al., 56 pages.

(56) References Cited

OTHER PUBLICATIONS

International Preliminary Report on Patentability in International Application No. PCT/US2012/057312, mailed Apr. 22, 2014, 5 pages.
International Preliminary Report on Patentability in International Application No. PCT/US2012/057153, mailed Apr. 22, 2014, 4 pages.
U.S. Appl. No. 14/263,164, entitled "System and Method for Redirected Firewall Discovery in a Network Environment," filed Apr. 28, 2014, Inventors: Geoffrey Cooper et al., 38 pages.
USPTO Jun. 6, 2014 Final Office Action from U.S. Appl. No. 12/844,964, 30 pages.
USPTO Jun. 4, 2014 Notice of Allowance from U.S. Appl. No. 13/032,851, 16 pages.
"Optical stateful security filtering approach based on code words," Sliti, M.; Boudriga, N., 2013 IEEE Symposium on Computers and Communications (ISCC), 10 pages.
Rothenberg, et al., "A Review of Policy-Based Resource and Admission Control Functions in Evolving Access and Next Generation Networks," Journal of Network and Systems Management, 16.1 (2008: 14-45, 32 pages.
USPTO Jun. 4, 2014 Nonfinal Office Action from U.S. Appl. No. 13/728,705, 16 pages.
Jun. 2, 2014 Office Action in Korean Patent Appln. No. 2013-7022241, [English translation], 6 pages.
USPTO Aug. 11, 2014 Notice of Allowance from U.S. Appl. No. 12/844,892, 8 pages.
International Search Report and Written Opinion in International Application No. PCT/US2013/066690, mailed Jul. 10, 2014, 12 pages.
Aug. 12, 2014 Office Action in Japanese Patent Application No. 2013-555531, English translation, 3 pages.
USPTO Sep. 10, 2014 Final Office Action from U.S. Appl. No. 13/229,502, 18 pages.
USPTO Sep. 11, 2014 Notice of Allowance from U.S. Appl. No. 12/844,964, 10 pages.
USPTO Oct. 27, 2014 Notice of Allowance from U.S. Appl. No. 13/728,705, 25 pages.
Muttik, Igor, and Chris Barton, "Cloud security technologies," Information security technical report 14.1 (2009), 1-6, 6 pages.
Nov. 13, 2014 Office Action in Japanese Patent Application No. 2013-521770, English translation, 2 pages.
Patent Examination Report No. 1, Australian Application No. 2012220642, mailed Nov. 5, 2014, 3 pages.
Notice of Allowance received for Korean Patent Application No. 10-2013-7022241, mailed on Dec. 12, 2014, 3 pages.
Extended European Search Report in Application No. 12842144.3-1853/2769509 PCT/US2012/057312, mailed Feb. 6, 2015, 6 pages.
Notice of Reasons for Refusal in Japanese Patent Application No. JP 2013-521767, mailed on Feb. 17, 2015, 5 pages of English language translation, 4 pages of Japanese language Office Action.
Baba, Tatsuya, et al., "A Proposal of an Integrated Worm Countermeasure System Based on Dynamic VLAN Control," Journal of Information Processing Society of Japan, Japan, Information Processing Society of Japan, Aug. 15, 2006, vol. 47, No. 8, pp. 2449-2511, 14 pages, English language Abstract only.
Fujita, Keisuke, et al., "Proposal of DF system with boot control function against unauthorized programs," Transactions of Computer Security Symposium 2007, Japan, Information Processing Society of Japan, Oct. 31, 2007, vol. 2007, No. 10, pp. 501-506, 7 pages, English language Abstract only.
Ashiwa, Takashi, "IT Keyword too late to ask: Bot," Nikkei Computer, Japan, Nikkei Business Publications, Oct. 30, 2006, No. 664, pp. 244-249, 14 pages, 7 pages of English translation.
Feb. 27, 2015 Office Action in Japanese Patent Application No. 2013-521770, English translation, 3 pages.
Mar. 2, 2015 Office Action in Korean Patent Appln. No. 2014-7021824, English translation, 4 pages.
Oct. 27, 2014 Office Action in EP Application No. 11 703 741.6-1870, 6 pages.
Feb. 28, 2015 Office Action in CN Application No. 2011800469004, English translation, 29 pages.
Mar. 23, 2015 Office Action in CN Application No. 201180046850X, English translation, 38 pages.
USPTO May 28, 2015 Nonfinal Rejection from U.S. Appl. No. 14/583,509, 17 pages.
Apr. 20, 2015 Office Action in Japanese Patent Appln. No. 2013-555531, [English translation], 2 pages.
Apr. 29, 2015 Supplementary European Search Report in EP Application No. EP 12 84 1554, 7 pages.
Cheneau, Tony, et al., "Significantly improved performances of the cryptographically generated addresses thanks to ECC and GPGPU," Computers & Security, vol. 29, No. 4, Jun. 2010, pp. 419-431, 13 pages.
USPTO Jul. 6, 2015 Nonfinal Rejection from U.S. Appl. No. 14/127,395, 32 pages.
USPTO Jul. 16, 2015 Corrected Notice of Allowability in U.S. Appl. No. 13/032,851, 3 pages.
International Preliminary Report on Patentability, International Application No. PCT/US2013/071327, mailed Jul. 9, 2015, 11 pages.
USPTO Aug. 12, 2015 Nonfinal Rejection from U.S. Appl. No. 14/263,164, 33 pages.
USPTO Sep. 29, 2015 Notice of Allowance from U.S. Appl. No. 14/583,509, 31 pages.
USPTO Oct. 19, 2015 Notice of Allowance from U.S. Appl. No. 14/263,164, 13 pages.
Decision to Grant a Patent in Japanese Patent Application No. JP 2013-521767, mailed on Oct. 22, 2015, 3 pages of English language translation.
Sep. 8, 2015 Office Action in Japanese Patent Application No. 2013-555531, English translation, 2 pages.
Office Action in CN 201180046900.4, mailed on Nov. 3, 2015, English translation, 29 pages.
USPTO Nov. 23, 2015 Nonfinal Rejection from U.S. Appl. No. 14/599,811, 27 pages.
Nov. 20, 2015 Office Action in CN Application No. 201180046850X, English translation, 36 pages.
Nov. 20, 2015 Office Action in CN Application No. 201280050877.0, English translation, 5 pages.
Nov. 13, 2015 Office Action in CN Application No. 201280010062.X, English translation, 5 pages.
USPTO Dec. 2, 2015 Notice of Allowance from U.S. Appl. No. 14/127,395, 7 pages.
USPTO Feb. 2, 2016 Notice of Allowance from U.S. Appl. No. 14/263,164, 10 pages.
USPTO Feb. 17, 2016 Nonfinal Rejection from U.S. Appl. No. 14/635,096, 17 pages.
USPTO Mar. 11, 2016 Notice of Allowance from U.S. Appl. No. 14/583,509, 32 pages.
Mar. 9, 2016 Office Action in CN Application No. 201180046900.4, English translation, 11 pages.
Apr. 8, 2016 Office Action in EP Application No. 11 710 915.7, 5 pages.
Feb. 25, 2016 Office Action in CN Application No. 201280053580.X, English translation, 16 pages.
May 3, 2016 Office Action in CN Application No. 201180046850X, with English translation, 10 pages.
U.S. Appl. No. 15/168,004, entitled "System and Method for Redirected Firewall Discovery in a Network Environment," filed May 28, 2016, Inventors: Geoffrey Cooper et al., 39 pages.
USPTO Jun. 6, 2016 Notice of Allowance from U.S. Appl. No. 14/127,395, 40 pages.
USPTO Jun. 6, 2016 Final Rejection from U.S. Appl. No. 14/599,811, 66 pages.

* cited by examiner

SYSTEM AND METHOD FOR INTERLOCKING A HOST AND A GATEWAY

RELATED APPLICATION

This Application is a continuation (and claims the benefit of priority under 35 U.S.C. §120) of U.S. application Ser. No. 13/437,900, filed Apr. 2, 2012, entitled "SYSTEM AND METHOD FOR INTERLOCKING A HOST AND A GATEWAY," Inventors Geoffrey Howard Cooper, et al. The disclosure of the prior application is considered part of (and is incorporated by reference in) the disclosure of this application.

TECHNICAL FIELD

This disclosure relates in general to the field of network security, and more particularly, to a system and a method for interlocking a host and a gateway through information sharing.

BACKGROUND

The field of network security has become increasingly important in today's society. The Internet has enabled interconnection of different computer networks all over the world. However, the Internet has also presented many opportunities for malicious operators to exploit these networks. Once malicious software has infected a host computer, a malicious operator may issue commands from a remote computer to control the malicious software. The software can be instructed to perform any number of malicious actions, such as sending out spam or malicious emails from the host computer, stealing sensitive information from a business or individual associated with the host computer, propagating to other host computers, and/or assisting with distributed denial of service attacks. In addition, the malicious operator can sell or otherwise give access to other malicious operators, thereby escalating the exploitation of the host computers. Thus, the ability to effectively protect and maintain stable computers and systems continues to present significant challenges for component manufacturers, system designers, and network operators.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DETAILED DESCRIPTION OF EXAMPLE EMBODIMENTS

Overview

A method is described in example embodiments below that include receiving a content tag associated with transferring a file over a network connection. A session descriptor may also be received. The session descriptor and the content tag may be correlated with a network policy, which may be applied to the network connection. In some embodiments, the content tag may be received with the session descriptor. The file may be tainted by another file in some embodiments, and the content tag may be associated with other file.

Example Embodiments

Figure 1:
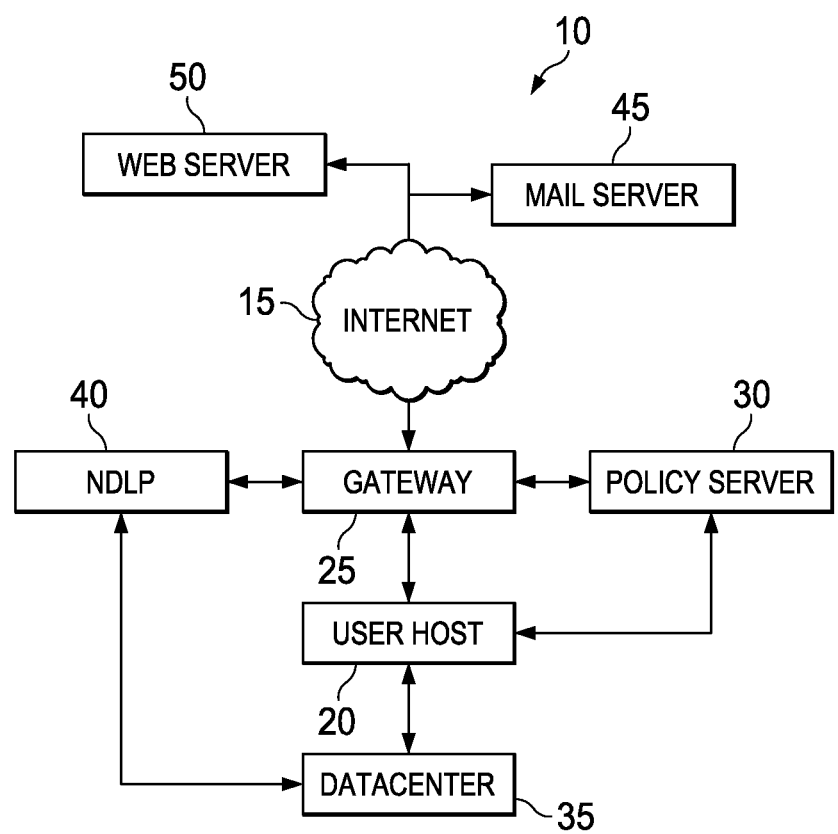
FIG. 1 is a simplified block diagram illustrating an example embodiment of a network environment in which information may be shared between a host and a network gateway for network protection in accordance with this specification.

Turning to FIG. 1, FIG. 1 is a simplified block diagram of an example embodiment of a network environment 10 in which a host and a network gateway may be interlocked through information sharing. In the embodiment illustrated in FIG. 1, network environment 10 can include Internet 15, a user host 20, a network gateway 25, a policy server 30, a datacenter 35, a network data loss protection (NDLP) server 40, a mail server 45, and a web server 50. In general, user host 20 may be any type of termination point in a network connection, including but not limited to a desktop computer, a server, a laptop, a mobile telephone, or any other type of device that can receive or establish a connection with a remote node, such as mail server 45 or web server 50. Gateway 25 may control communications between user host 20 and other network nodes attached to Internet 15, and may be representative of or include a firewall, intrusion prevention system (IPS), or other security application to block unauthorized access while permitting authorized communications. Policy server 20 may be used to manage user hosts, including user host 20, and to administer and distribute network policies. Thus, in this example embodiment, user host 20 may communicate with servers attached to Internet 15, such as mail server 45 or web server 50, only by establishing a connection through network gateway 25 if permitted by policies implemented in gateway 25. Datacenter 35 is representative of any storage device or devices, or any virtualized storage device or devices, accessible to user host 20 over a network connection. NDLP 40 is representative of any server that can index content found at rest in network environment 10.

Each of the elements of FIG. 1 may couple to one another through simple interfaces or through any other suitable connection (wired or wireless), which provides a viable pathway for network communications. Additionally, any one or more of these elements may be combined or removed from the architecture based on particular configuration needs. Network environment 10 may include a configuration capable of transmission control protocol/Internet protocol (TCP/IP) communications for the transmission or reception of packets in a network. Network environment 10 may also operate in conjunction with a user datagram protocol/IP (UDP/IP) or any other suitable protocol where appropriate and based on particular needs.

For purposes of illustrating the techniques for providing network security in example embodiments, it is important to understand the activities occurring within a given network. The following foundational information may be viewed as a basis from which the present disclosure may be properly explained. Such information is offered earnestly for purposes of explanation only and, accordingly, should not be construed in any way to limit the broad scope of the present disclosure and its potential applications.

Typical network environments used in organizations and by individuals include the ability to communicate electronically with other networks using the Internet, for example, to access web pages hosted on servers connected to the Internet, to send or receive electronic mail (i.e., email) messages, or to exchange files. Malicious users are continuously developing new tactics for using the Internet to spread malware and to gain access to confidential information. Malware may subvert a host and use it for malicious activity, such as spamming or information theft. Of course, malware is not a prerequisite to information theft. Individuals can also be compromised and intentionally transmit (or attempt to transmit) information in violation of applicable laws and/or policies. Information may also be transmitted inadvertently in violation of such laws and policies.

In some instances, malware may be used to deceive a person by using a different network protocol exchange than the person expects. The malware may be packaged so as to convince the person to allow access to run it in some innocuous way, thus allowing it access to the network, which often may require passing through a firewall or other security measure. The malware may then exploit the access to engage in alternative or additional activities not contemplated by the person. For example, a game may send email messages or a word processor may open a web connection. At the same time, the malware may also use standard protocols to deceive the firewall into permitting the malware to establish remote connections.

Botnets, for example, use malware and are an increasing threat to computer security. In many cases they employ sophisticated attack schemes that include a combination of well-known and new vulnerabilities. Botnets generally use a client-server architecture where a type of malicious software (i.e., a bot) is placed on a host computer and communicates with a command and control (C&C) server, which may be controlled by a malicious user (e.g., a botnet operator). Usually, a botnet is composed of a large number of bots that are controlled by the operator using a C&C protocol through various channels, including Internet Relay Chat (IRC) and peer-to-peer (P2P) communication. The bot may receive commands from the C&C server to perform particular malicious activities and, accordingly, may execute such commands. The bot may also send any results or pilfered information back to the C&C server. A bot is often designed to initiate communication with the C&C server and to masquerade as normal web browser traffic. For example, a bot may use a port typically used to communicate with a web server. Such bots, therefore, may not be detected by existing technologies without performing more detailed packet inspection of the web traffic. Moreover, once a bot is discovered, the botnet operator may simply find another way to masquerade network traffic by the bot to continue to present as normal web traffic. More recently, botnet operators have crafted bots to use encryption protocols such as, for example, secure socket layer (SSL), thereby encrypting malicious network traffic. Such encrypted traffic may use a Hypertext Transfer Protocol Secure (HTTPS) port such that only the endpoints involved in the encrypted session can decrypt the data. Thus, existing firewalls and other network intrusion prevention technologies may be unable to perform any meaningful inspection of the web traffic and bots continue to infect host computers within networks.

Other software security technology focused on preventing unauthorized program files from executing on a host computer may have undesirable side effects for end users or employees of a business or other organizational entity. Network or Information Technology (IT) administrators may be charged with crafting extensive policies relevant to all facets of the business entity to enable employees to exchange information with desirable and trusted network resources. Without extensive policies in place, employees may be prevented from downloading or sending data from network resources that are not specifically authorized, even if such software and other data facilitate legitimate and necessary business activities. Such systems may be so restrictive that if unauthorized software is found on a host computer, any host computer activities may be suspended pending network administrator intervention. Moreover, at the network level there may simply be too many applications to effectively track and incorporate into policies. Large whitelists or blacklists can be difficult to maintain and may degrade network performance, and some applications may not be susceptible to easy identification.

In accordance with one embodiment, network environment 10 can overcome these shortcomings (and others) by tagging files based on content and sharing content tags with a network gateway. In particular embodiments, data may be scanned and a classification policy may be applied to tag data based on content. The content tags may be shared with a network gateway, and the network gateway may filter network traffic based on the content tags. Session information may also be shared with the network gateway, which may further filter network traffic based on the session information. Information may be shared, for example, through an in-band or out-of-band protocol that allows a host agent to communicate with a network gateway to collectively and mutually achieve better security.

In some embodiments, a host agent may provide content tags to a network gateway, while in other embodiments content tags may be provided by an external source such as a data-at-rest (DAR) server. For example, in some embodiments, a DAR server such as NDLP 40 may periodically scan and index files in a datacenter, apply a classification policy to identify appropriate content tags for each files, and create a map between files and content tags. In other example embodiments, a host agent or DAR server may periodically scan and index files on a host, apply a classification policy, and map files to content tags. In still other embodiments, a host agent can scan a file as it is accessed to determine appropriate content tags. A gateway may receive content tags (e.g., from a DAR server, a host agent, or a content tag server) and filter a file transfer based on the content tag. A host agent or other server may also classify content associated with an in-bound transfer and provide a content tag to the gateway to filter in-bound transfers.

In another particular example, session descriptors may be shared along with content tags. Session descriptors generally include information about a host and an application associated with a given network session. For example, a session descriptor may include a UUID associated with the host and the user credentials of a process owner. Since a user can run separate processes with different user credentials, such information may be particularly advantageous for Citrix and terminal services. A session descriptor may additionally include a filename, pathname or other unique identifier of an application file (e.g., C:\ . . . \WINWORD.EXE) that is running the process attempting to establish a network connection. For example, in some embodiments the application may be identified by a hash function of the application's executable file, so as to make it more difficult for a malicious user to spoof the application name. A gateway may correlate this information with an application identifier or protocol to ensure that the application is performing as expected.

In some instances, a process may be attempting to transfer information in or out of the network, and a session description may also include a unique identifier associated with the information (e.g., a hash of a file). A session descriptor may also contain information about the host environment, such as software installed on the host and the current configuration and state of the software, permitting the gateway to act as a network access control device. For example, a session descriptor may indicate whether the local anti-virus system is up to date and running. If host-based data loss prevention (HDLP) software is available, a session descriptor may also include file typing information for file transfer. HDLP normally determines the type of file being transmitted out of the network (e.g., PDF, Word, etc.). The gateway may have additional policies about certain file types being transmitted over particular protocols, which may not be visible directly to an HDLP program.

The host agent may understand an application on the host as an executable file that is running a process with specific authentication, for example, while the network gateway may understand the application as a protocol in a TCP connection, which may also be correlated to a particular user authentication. The host agent may share session descriptors with the network gateway, and the network gateway may share network policy with the host agent as needed to correlate application activities with expected network behavior. Network policy may include elements of security policy as well as other network specific parameters, such as quality of service (QoS) and routing. A host agent may also be associated with a universally unique identifier (UUID), which can be used to correlate connections and activities originating behind network address translators.

A host agent may also notify the gateway of additional network connections to the host. If a host has both wireless and wired connections active simultaneously, for example, there may be a risk of data received on one connection being transmitted on the other, so it may be desirable to restrict access to sensitive data. A host agent may also notify the gateway if the connection is associated with a virtual machine. A host agent may also notify the gateway if the host has mountable read/write media, such as a USB stick attached.

Dynamic information sharing may be provided in network environment 10. Communications between a user host and a network gateway may be encoded in routine network traffic (e.g., IP or TCP options fields, packet padding locations, or trailers on DNS packets), or transmitted in a separate network packet from the host to the network gateway as each connection starts. In some embodiments, a network gateway may send a UDP packet containing a randomly chosen sequence number or nonce to a user host on the user host's first egress. On each TCP open of a permitted connection, the user host agent may format a hash of the current nonce and sequence ID, place it in the packet along with other session descriptors. A hash of packet contents may also be included in certain embodiments. The network gateway may receive the UDP packet and save the session descriptors to use in applying network policy to the TCP stream. The network gateway may send a new nonce periodically to discourage replay attacks.

In some embodiments of network environment 10, user host 20 may include multiple attachment points, causing it to have multiple IP addresses. In other embodiments, user host 20 may use the IP version 6 (IPv6), perhaps including Privacy Extensions (RFC4941), causing it to have one or more registered and known IPv6 addresses and one or more hidden or private IPv6 addresses. In these embodiments, gateway 25 may readily use dynamic information sharing to discover the user to host mapping for all the addresses on user host 20.

This dynamic information sharing in network environment 10 may provide several benefits over conventional architectures. For example, by coordinating firewall policy with a host agent, a gateway can apply policy based on user identifier, content classification, application identifier, or any combination thereof. Moreover, only applications that need to be granularly controlled need to be controlled by the gateway. Thus, the gateway may control arbitrary or evasive applications, provide higher effective throughput, and control mobile-user traffic. In addition, traffic that does not need to be completely allowed or denied can be rate-limited. Arbitrary or evasive applications can also be rate-limited with process information available on a gateway, and differentiated services can be provided for managed and unmanaged hosts.

Figure 2:
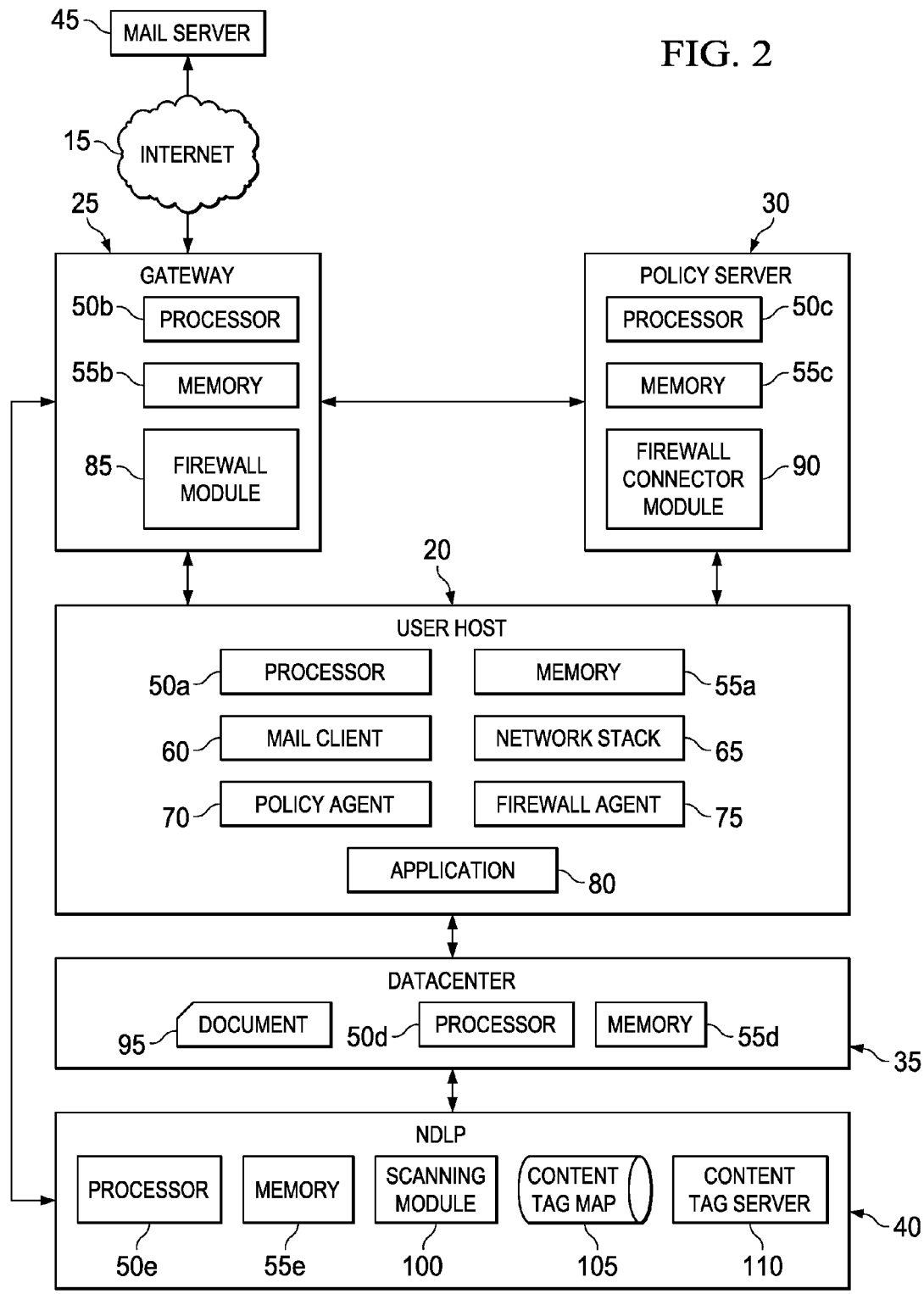
FIG. 2 is a simplified block diagram illustrating additional details associated with one potential embodiment of the network environment, in accordance with this specification.

Turning to FIG. 2, FIG. 2 is a simplified block diagram illustrating additional details that may be associated with one potential embodiment of network environment 10. FIG. 2 includes Internet 15, user host 20, network gateway 25, policy server 30, datacenter 35, NDLP 40, and mail server 35. Each of user host 20, network gateway 25, policy server 30, datacenter 35, and NDLP 40 may include a respective processor 50a-50e and a respective memory element 55a-5e, and may additionally include various hardware, firmware, and/or software elements to facilitate operations described herein. More particularly, user host 20 may include a mail client 60, a network stack 65, a policy agent 70, a firewall agent 75, and an application 80. Gateway 25 may include a firewall module 85, and policy server 30 may include a firewall connector module 90. Datacenter 35 may also store and provide access to documents, files, and other data, such as document 95. NDLP 40 may include a scanning module 100, a content tag map 105, and a content tag server 110.

In general, scanning module 100 can scan data found at rest in network environment 10, particularly in datacenter 35, apply a content tagging policy to identify content for tagging, and index the content and associated tags in a repository, such as content tag map 105. A content tag may be any indicator reflective of content in a file, such as source code, trade secrets or other intellectual property, financial reports, or strategic business plans, for example. A "file" in this context refers broadly to any block of electronically stored data, including without limitation text documents, spreadsheets, images, databases, email messages, source code, and executable files. A content tag may additionally or alternatively be indicative of content sensitivity, such as public domain, confidential, proprietary, top secret, or export controlled, for example. Content tag server 110 is representative of any server that can process queries for content tags based on a hash or other unique identifier, retrieve the content tags from a content tag map, such as content tag map 105, and return the results. In some embodiments, as in FIG. 2, scanning module 100 and content tag server 110 may be co-located in a single element, but may be distributed in other embodiments.

In one example implementation, user host 20, network gateway 25, policy server 30, and/or NDLP 40 are network elements, which are meant to encompass network appliances, servers, routers, switches, gateways, bridges, loadbalancers, firewalls, processors, modules, or any other suitable device, component, element, or object operable to exchange information in a network environment. Network elements may include any suitable hardware, software, components, modules, interfaces, or objects that facilitate the operations thereof. This may be inclusive of appropriate algorithms and communication protocols that allow for the effective exchange of data or information. However, user host 20 may be distinguished from other network elements as it tends to serve as a terminal point for a network connection, in contrast to a gateway or router.

In regards to the internal structure associated with elements of network environment 10, each of user host 20, network gateway 25, policy server 30, datacenter 35, and/or NDLP 40 can include memory elements (e.g., as shown in FIG. 2) for storing information to be used in the operations outlined herein. Moreover, each element may include one or more interfaces, and such interfaces may also include appropriate memory elements. Each element may keep information in any suitable memory element (e.g., random access memory (RAM), read-only memory (ROM), erasable programmable ROM (EPROM), electrically erasable programmable ROM (EEPROM), application specific integrated circuit (ASIC), etc.), software, hardware, or in any other suitable component, device, element, or object where appropriate and based on particular needs. Any of the memory elements discussed herein should be construed as being encompassed within the broad term "memory element" or "memory." Information being used, tracked, sent, or received could be provided in any database, register, queue, table, cache, control list, or other storage structure, all of which can be referenced at any suitable timeframe. Any such storage options may be included within the broad term "memory element" or "memory" as used herein.

In certain example implementations, the functions outlined herein may be implemented by logic encoded in one or more tangible media (e.g., embedded logic provided in an ASIC, digital signal processor (DSP) instructions, software (potentially inclusive of object code and source code) to be executed by a processor, or other similar machine, etc.), which may be inclusive of non-transitory media. In some of these instances, memory elements can store data used for the operations described herein. This includes the memory elements being able to store software, logic, code, or processor instructions that are executed to carry out the activities described herein.

In one example implementation, user host 20, network gateway 25, policy server 30, datacenter 35, and/or NDLP 40 may include firmware and/or software modules to achieve, or to foster, operations as outlined herein. In other embodiments, such operations may be carried out by hardware, implemented externally to these elements, or included in some other network device to achieve the intended functionality. Alternatively, these elements may include software (or reciprocating software) that can coordinate in order to achieve the operations, as outlined herein. In still other embodiments, one or all of these devices may include any suitable algorithms, hardware, firmware, software, components, modules, interfaces, or objects that facilitate the operations thereof.

Additionally, each of user host 20, network gateway 25, policy server 30, datacenter 35, and/or NDLP 40 may include one or more processors (or virtual processors) that can execute software or an algorithm to perform activities as discussed herein. A processor, virtual processor, logic unit, or other processing unit can execute any type of instructions associated with the data to achieve the operations detailed herein. In one example, a processor could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array (FPGA), an EPROM, an EEPROM) or an ASIC that includes digital logic, software, code, electronic instructions, or any suitable combination thereof. Any of the potential processing elements, modules, and machines described herein should be construed as being encompassed within the broad term "processor."

Figure 3:
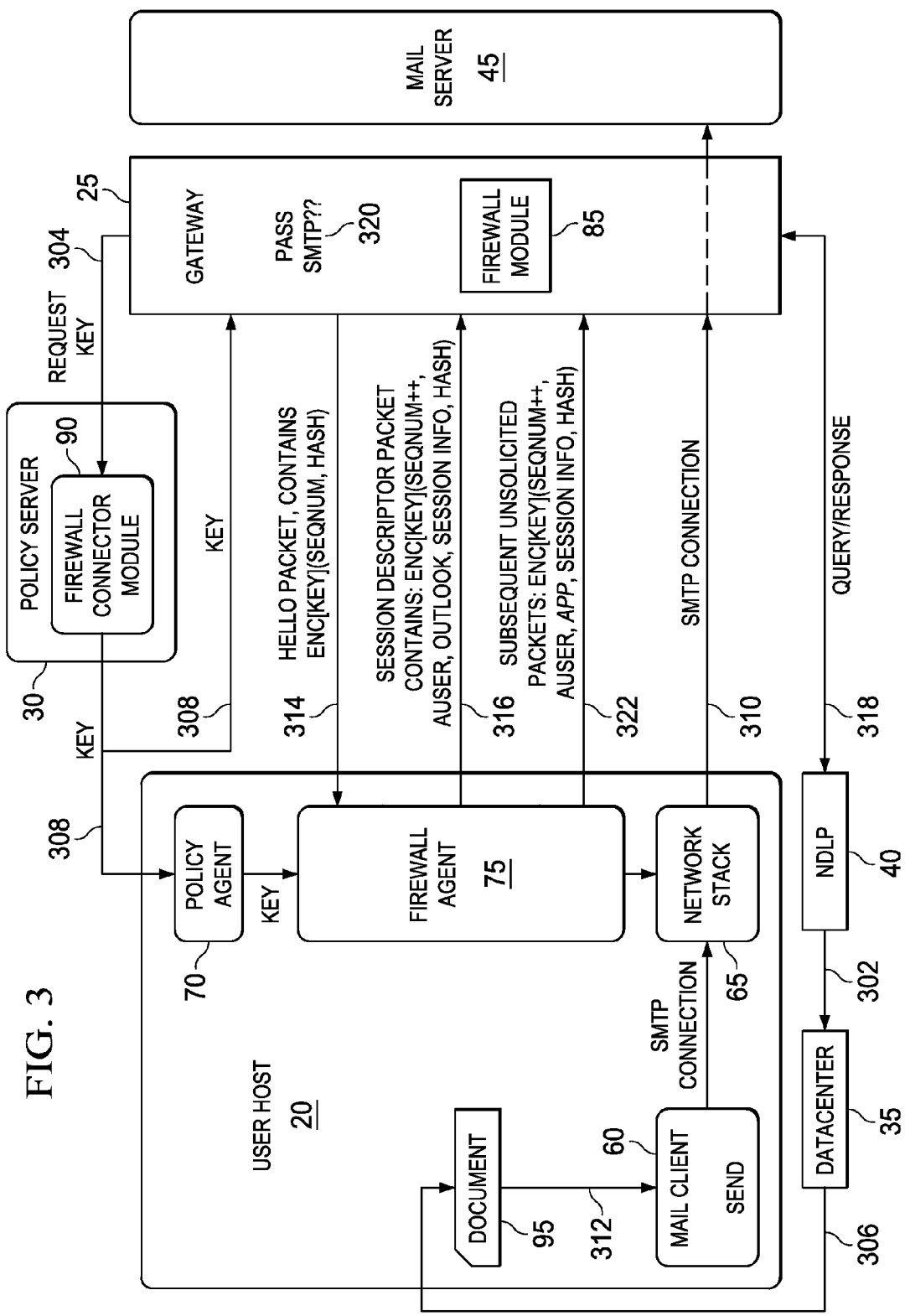
FIG. 3 is a simplified block diagram illustrating example operations associated with one embodiment of a network environment in accordance with this specification.

FIG. 3 is a simplified block diagram illustrating example operations associated with one embodiment of network environment 10 that can use content tags and session information to filter traffic. As a preliminary matter or periodically, NDLP 40 may scan servers in datacenter 35 at 302 and apply classification policy to classify content in datacenter 35, including document 95. For example, NDLP 40 may scan data for keywords or other criteria to determine an appropriate content tag or tags. NDLP 40 may further calculate a hash for such data and link, map, relate, or otherwise associate content tags with hashes, for example in content tag map 105. Also preliminarily or periodically, firewall module 85 may request a key from firewall connector module 90 in policy server 30 at 304. For this particular example, user host 20 also retrieves document 95 from datacenter 35 at 306. At 308, firewall connector module 90 can generate a key, and send it to firewall module 85 and to all hosts, including policy agent 70 on user host 20.

At 310, an application such as mail client 60 may initiate a connection to a remote server such as mail server 45. Thus, for example, mail client 60 may attach document 95 to an e-mail message at 312 and initiate a connection to mail server 45 using simple mail transfer protocol (SMTP). Network stack 65 may then route the traffic through firewall module 85. At 314, firewall module 85 can then send a HELLO packet to firewall agent 75 on user host 20 as a request for a session descriptor. A HELLO packet may include, for example, a KEY value, a SEQNUM, and a HASH value. The SEQNUM may be used both as a nonce and a sequence number. The HASH value is generally a suitable crypto hash, such as SHA-1, on data in the message. Firewall agent 75 may then decrypt the request from firewall module 85, obtain information from network stack 65, and send a sequenced, hashed, encrypted packet containing a session descriptor to firewall module 80 at 316. For example, if a user has been authenticated with an identification of "auser" and is using Microsoft Outlook as a mail client, then the session descriptor may contain: auser, Outlook, session info. This may be encrypted and transmitted along with a sequence number and has, as Enc[KEY](SEQNUM++, session descriptor, HASH).

In the example embodiment of FIG. 3, firewall module 85 may analyze the connection and determine that it includes a document transfer, calculate a hash for document 95, and query NDLP 40 at 318 for a content tag based on the hash. Gateway 25 may also query a reputation service (not shown) that can provide a reputation score for the address of mail server 45, and possibly the location of mail server 45 based on its address. The document may be buffered until a response is received, or only the last bit may be held, for example. In other example embodiments, though, an agent on user host 20 (e.g., policy agent 70 or firewall agent 75) may calculate the hash and query NDLP 40. Firewall module 85 may apply network policies at 320, based on the session description, content tag(s) associated with document 95, reputation of mail server 45, and/or the country associated with the IP address of mail server 45, for example, to determine if the connection to mail server 45 should be allowed. Additional session descriptor packets may be sent at 322 without the need for firewall module 85 to send a HELLO packet, as in 314.

Figure 4:
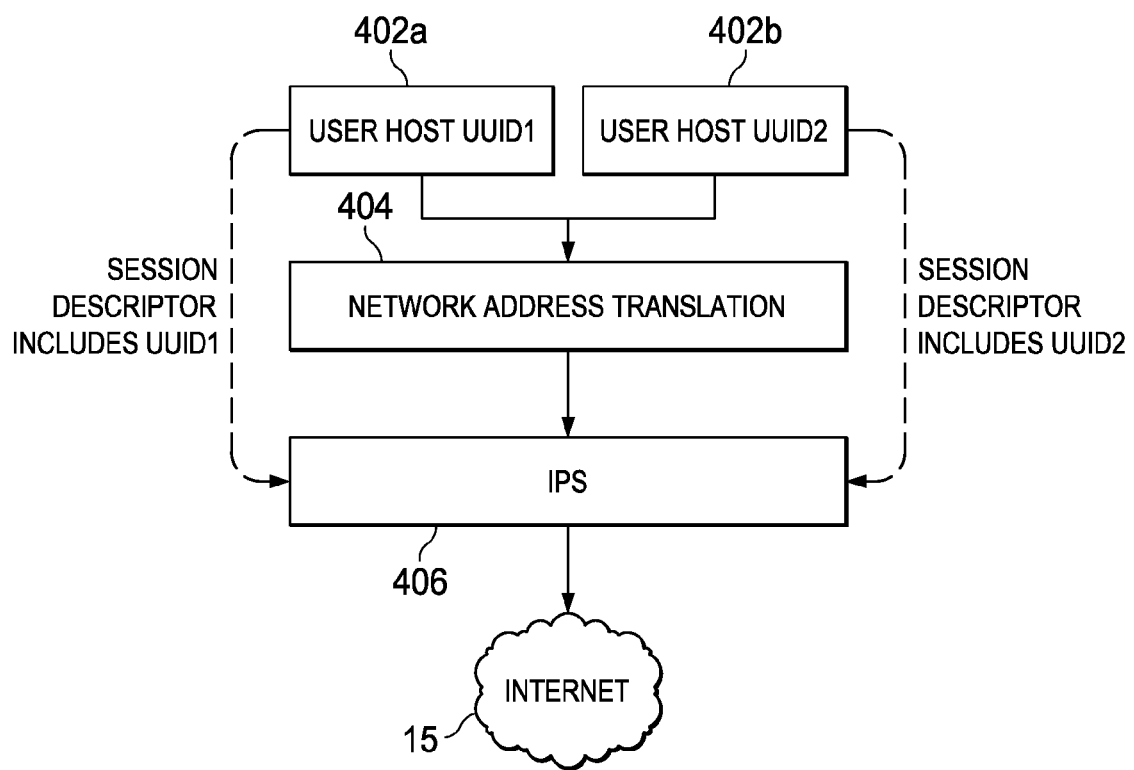
FIG. 4 is a simplified block diagram illustrating example operations associated with another embodiment of a network environment in accordance with this specification.

FIG. 4 is a simplified block diagram illustrating example operations associated with another embodiment of network environment 10. In FIG. 4, network environment 10 includes hosts 402a-402b, a network address translator 404, an intrusion prevention system (IPS) 406, and Internet 15. Host 402a is associated with a first UUID (UUID1) and host 402b is associated with a second UUID (UUID2). A session descriptor may be transmitted out-of-band or in-band through network address translator 404, or alternatively, a session identifier may be transmitted in-band, while a session descriptor is transmitted out-of-band. In such an embodiment, the session descriptor can also include the session identifier for correlating the in-band and out-of-band communication. Although network address translator 404 may alter the IP addresses of hosts 402a-402b, IPS 406 may use the UUIDs of hosts 402a-402b to correlate traffic so that network policy can be applied to a host based on all network addresses associated with the host.

Note further that host 402a may be used concurrently by multiple users in certain embodiments, as in a timesharing system, Microsoft Windows "Switch Users" capability, Citrix, or Microsoft Terminal Services. Firewall module 85 may use information in the session descriptor to pair each network connection with the user that established it, permitting policy to be implemented differently by user rather than singly for all users of host 402a.

Figure 5:
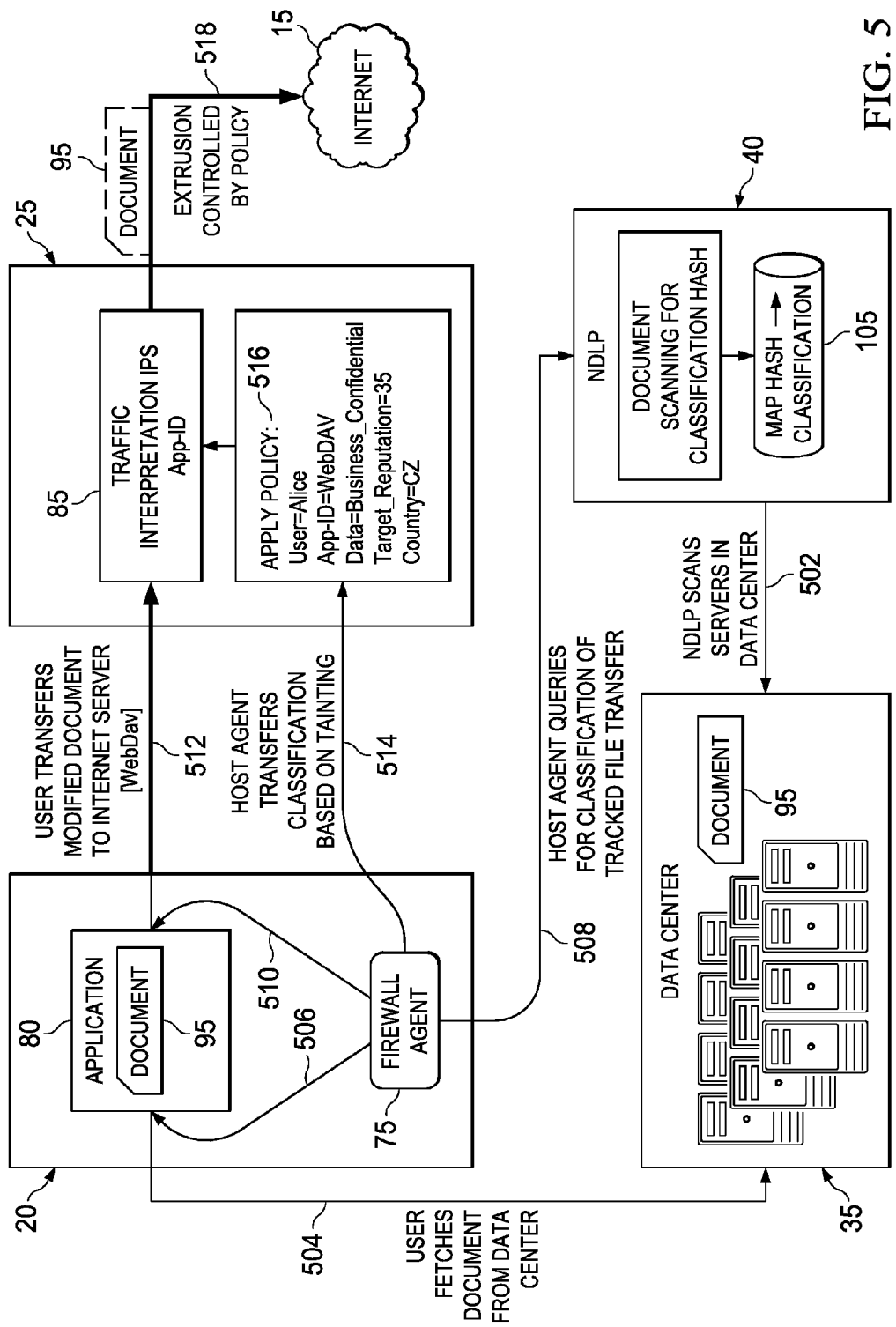
FIG. 5 is a simplified block diagram illustrating additional details that may be associated with other embodiments of a network environment in accordance with this specification.

FIG. 5 is a simplified block diagram illustrating additional details that may be associated with other embodiments of network environment 10. As a preliminary matter or periodically, NDLP 40 may scan servers in datacenter 35 at 502 and apply classification policy to classify (i.e., identify appropriate content tags) data in datacenter 35, including document 95. NDLP 40 may further calculate a hash for such data and map classifications with hashes, for example in content tag map 105. At 504, user host 20 may retrieve document 95 from datacenter 35. A agent running on user host 20, such as firewall agent 75, can detect the transfer of document 95 to user host 20 and calculate a hash of document 95 at 506, and query NDLP 40 at 508 for content tags associated with document 95 based on the hash. Modifications to document 95 may be monitored at 510. A transfer of the modified document 95 may be initiated at 512. In the example of FIG. 5, a transfer is initiated using a web distributed authoring and versioning (WebDAV) protocol, but any other suitable protocol may be used, including SMTP, a file transfer protocol (FTP), or a hypertext transfer protocol (HTTP), for example.

Firewall module 85 may exchange a session descriptor substantially as described above with reference to FIG. 3. Although a modified document 95 should no longer match a hash in hash classification map 105, modified document 95 is a "tainted" version of original document 95 and thus retains the same content tags. A tainted file generally includes modified versions of any file having a content tag, and it may also include any other files that are modified, copied, encrypted, transferred, or otherwise used during the same session in which a tagged file is opened, read, accessed, or otherwise used. The host agent (e.g., firewall agent 75) can detect the transfer of the tainted file and transfer the content tags associated with document 95 to gateway 25 at 514. In some embodiments, the content tags may be combined with the session descriptor. In FIG. 5, for instance, firewall module 85 may receive a session descriptor from user host 20 that identifies "Alice" as the user and WebDAV as the application, and may receive a content sensitivity tag of "Business_Confidential" for document 95 from firewall agent 75. Firewall module 85 further queries a reputation service (not shown) that indicates the WebDAV server is located in Switzerland (i.e., CZ) and has a reputation score of 35.

Firewall module 85 may apply network policies at 516, based on the session description, content tag associated with document 95, reputation of the WebDAV server, and/or the country associated with the IP address of the target, for example, to determine if the transfer should be allowed at 518.

Figure 6:
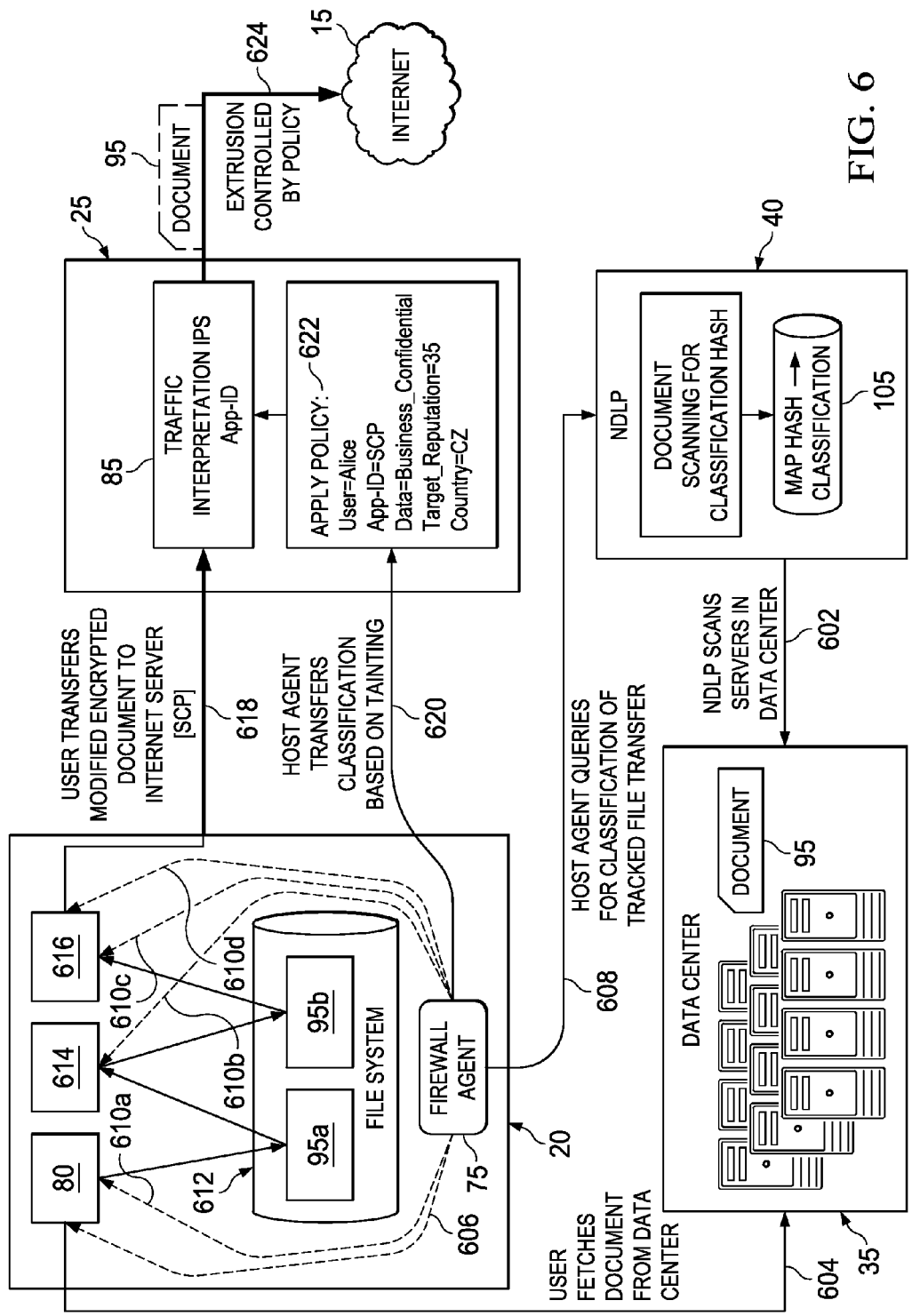
FIG. 6 is a simplified block diagram illustrating additional details that may be associated with yet other embodiments of a network environment in accordance with this specification.

FIG. 6 is a simplified block diagram illustrating additional details that may be associated with yet other embodiments of network environment 10. As a preliminary matter or periodically, NDLP 40 may scan servers in datacenter 35 at 602 and apply classification policy to identify appropriate content tags for data in datacenter 35, including document 95. NDLP 40 may further calculate a hash for such data and map classifications with hashes, for example in content tag map 105. At 604, user host 20 may retrieve document 95 from datacenter 35. A agent running on user host 20, such as firewall agent 75, can detect the transfer of document 95 to user host 20 and calculate a hash of document 95 at 606, and query NDLP 40 at 608 for content tags associated with document 95 based on the hash. Files tainted by document 95 may be monitored at 610a-610d. For example, application 80 may modify document 95 and save it as a document 95a on a file system 612, which may be monitored at 610a. An encryption application 614 may encrypt document 95a and save it as document 95b, which can be monitored at 610b. Yet another application, such as a secure copy program (SCP) 616 can then load document 95b, which may be monitored at 610c. This application (e.g., secure copy program 616) can initiate a transfer of document 95b over an encrypted connection at 618. Although the document being transferred is both a modified and encrypted version of document 95, it is a tainted version and firewall agent 75 can enforce the same classification (i.e., apply the same content tags). The host agent (e.g., firewall agent 75) can detect the transfer at 610d and transfer the content tags associated with document 95 to gateway 25 at 620. Firewall module 85 may apply network policies at 622, based on the session description, content tags associated with document 95, reputation of the target or destination server, or the country associated with the IP address of the target, for example, to determine if the document extrusion should be allowed at 624.

Note that with the examples provided above, as well as numerous other potential examples, interaction may be described in terms of two, three, or four network elements. However, this has been done for purposes of clarity and example only. In certain cases, it may be easier to describe one or more of the functionalities of a given set of operations by only referencing a limited number of network elements. It should be appreciated that network environment 10 is readily scalable and can accommodate a large number of components, as well as more complicated/sophisticated arrangements and configurations. Accordingly, the examples provided should not limit the scope or inhibit the broad teachings of network environment 10 as potentially applied to a myriad of other architectures. Additionally, although described with reference to particular scenarios, where a particular module, such as an analyzer module, is provided within a network element, these modules can be provided externally, or consolidated and/or combined in any suitable fashion. In certain instances, such modules may be provided in a single proprietary unit.

It is also important to note that the steps in the appended diagrams illustrate only some of the possible scenarios and patterns that may be executed by, or within, network environment 10. Some of these steps may be deleted or removed where appropriate, or these steps may be modified or changed considerably without departing from the scope of teachings provided herein. In addition, a number of these operations have been described as being executed concurrently with, or in parallel to, one or more additional operations. However, the timing of these operations may be altered considerably. The preceding operational flows have been offered for purposes of example and discussion. Substantial flexibility is provided by network environment 10 in that any suitable arrangements, chronologies, configurations, and timing mechanisms may be provided without departing from the teachings provided herein.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. One or more non-transitory computer readable media that include code for execution and when executed by one or more processors is operable to perform operations comprising:
   receiving a content tag associated with transferring a first file over a network connection from a host, wherein the content tag indicates a classification of content in a second file, and wherein the first file and the second file were used on the host during a same session;
   correlating the content tag with a network policy; and
   applying the network policy to the network connection.

2. The one or more non-transitory computer readable claim 1, wherein the content tag is associated with the first file based on the first file and the second file being used on the host during the same session.

3. The one or more non-transitory computer readable claim 1, wherein when executed by the one or more processors, the code is operable to perform operations comprising:
   receiving a session descriptor associated with transferring the first file, wherein the session descriptor is correlated with the network policy.

4. The one or more non-transitory computer readable claim 3, wherein the session descriptor includes at least one of:
   a user identifier associated with transferring the first file; or
   an identifier of an application associated with transferring the first file.

5. The one or more non-transitory computer readable claim 3, wherein the session descriptor includes the content tag.

6. The one or more non-transitory computer readable claim 1, wherein the content tag is a content sensitivity tag.

7. An apparatus, comprising:
   a firewall module; and
   one or more processors configured to execute instructions associated with the firewall module such that the apparatus is configured to:
      receive a content tag associated with transferring a first file over a network connection, wherein the content tag indicates a classification of content in a second file, and wherein the first file and the second file were used on the host during a same session;
      correlate the content tag with a network policy; and
      apply the network policy to the network connection.

8. The apparatus of claim 7, wherein the content tag is associated with the first file based on the first file and the second file being used on the host during the same session.

9. The apparatus of claim 7, wherein the apparatus is further configured to:
   receive a session descriptor associated with transferring the first file, wherein the session descriptor is correlated with the network policy.

10. The apparatus of claim 9, wherein the session descriptor includes the content tag.

11. The apparatus of claim 9, wherein the apparatus is further configured to:
    receive a reputation score associated with a destination for the first file, wherein the reputation score is correlated with the network policy.

12. One or more non-transitory computer readable media that include code for execution and when executed by one or more processors is operable to perform operations comprising:
    receiving a content tag that indicates a classification of content in a first file;
    associating the content tag with a second file based on the second file and the first file being used during a same session on a host;
    detecting a transfer of the second file to a network gateway; and
    sending the content tag to the network gateway.

13. The one or more non-transitory computer readable claim 12, wherein when executed by the one or more processors, the code is operable to perform operations comprising:
    monitoring one or more other files being used on the host during the same session as the first file to detect whether any of the one or more other files are transferred to the network gateway, wherein the second file is one of the one or more other files.

14. The one or more non-transitory computer readable claim 12, wherein when executed by the one or more processors, the code is operable to perform operations comprising:
    detecting a transfer of the first file to the host;
    calculating a hash of the first file; and
    querying a content tag server with the hash to obtain the content tag.

15. The one or more non-transitory computer readable claim 12, wherein when executed by the one or more processors, the code is operable to perform operations comprising:
    monitoring the first file on the host to determine whether any modifications are made to the first file.

16. One or more non-transitory computer readable media that include code for execution and when executed by one or more processors is operable to perform operations comprising:
    receiving a content tag that indicates a classification of content in a first file;
    associating the content tag with a second file when the second file is a modified version of the first file;
    detecting a transfer of the second file to a network gateway; and
    sending the content tag to the network gateway.

17. The one or more non-transitory computer readable claim 16, wherein when executed by the one or more processors, the code is operable to perform operations comprising:
    detecting a transfer of the first file to the host;
    calculating a hash of the first file; and
    querying a content tag server with the hash to obtain the content tag.

18. The one or more non-transitory computer readable claim 16, wherein when executed by the one or more processors, the code is operable to perform operations comprising:
monitoring the first file to determine whether any modifications are made to the first file.

19. The one or more non-transitory computer readable claim 16, wherein when executed by the one or more processors, the code is operable to perform operations comprising:
monitoring the second file for modifications when the monitoring the first file indicates at least one modification was made to the first file to create the second file.

20. The one or more non-transitory computer readable claim 16, wherein the second file is an encrypted version of the first file.

21. An apparatus, comprising:
one or more processors; and
a firewall module including instructions that, when executed by the one or more processors, cause the apparatus to:
receive a content tag that indicates a classification of content in a first file;
associate the content tag with a second file based on the second file and the first file being used during a same session on a host;
detect a transfer of the second file to a network gateway; and
send the content tag to the network gateway.

22. The apparatus of claim 21, wherein the instructions, when executed by the one or more processors, cause the apparatus to:
detect a transfer of the first file to the host;
calculate a hash of the first file; and
query a content tag server with the hash to obtain the content tag.

23. An apparatus, comprising:
one or more processors; and
a firewall module including instructions that, when executed by the one or more processors, cause the apparatus to:
receive a content tag that indicates a classification of content in a first file;
associate the content tag with a second file if the second file is a modified version of the first file;
detect a transfer of the second file to a network gateway; and
send the content tag to the network gateway.

24. The apparatus of claim 23, wherein the instructions, when executed by the one or more processors, cause the apparatus to:
monitor the first file to determine whether any modifications are made to the first file.

* * * * *